(12) United States Patent
Guo et al.

(10) Patent No.: US 12,537,561 B2
(45) Date of Patent: Jan. 27, 2026

(54) DATA INTERACTION APPARATUS AND INTERACTION METHOD THEREOF, ELECTRONIC DEVICE, AND STORAGE MEDIUM

(71) Applicants: Beijing BOE Display Technology Co., Ltd., Beijing (CN); BOE Technology Group Co., Ltd., Beijing (CN)

(72) Inventors: Rui Guo, Beijing (CN); Cuilan Huang, Beijing (CN); Zheng Wang, Beijing (CN); Yujia Zhang, Beijing (CN); Hetao Wang, Beijing (CN); Zhanchang Bu, Beijing (CN)

(73) Assignees: Beijing BOE Display Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 844 days.

(21) Appl. No.: 17/789,169

(22) PCT Filed: Aug. 26, 2021

(86) PCT No.: PCT/CN2021/114850
§ 371 (c)(1),
(2) Date: Mar. 2, 2023

(87) PCT Pub. No.: WO2023/024039
PCT Pub. Date: Mar. 2, 2023

(65) Prior Publication Data
US 2024/0178882 A1    May 30, 2024

(51) Int. Cl.
*H04B 5/43* (2024.01)
*G06F 3/041* (2006.01)
*G06F 3/042* (2006.01)

(52) U.S. Cl.
CPC ............. *H04B 5/43* (2024.01); *G06F 3/0412* (2013.01); *G06F 3/0416* (2013.01); *G06F 3/0421* (2013.01)

(58) Field of Classification Search
None
See application file for complete search history.

(56) References Cited

U.S. PATENT DOCUMENTS

| | | | |
|---|---|---|---|
| 2015/0116238 A1* | 4/2015 | Liu | G09G 5/12 345/1.3 |
| 2020/0266732 A1* | 8/2020 | Kaidu | H02P 6/20 |
| 2020/0335869 A1 | 10/2020 | Jia | |

FOREIGN PATENT DOCUMENTS

| | | |
|---|---|---|
| CN | 111525232 A | 8/2020 |
| CN | 111834731 A | 10/2020 |

(Continued)

*Primary Examiner* — Frantz Bataille
(74) *Attorney, Agent, or Firm* — Ling Wu; Stephen Yang; Ling and Yang Intellectual Property

(57) ABSTRACT

Provided are a data interaction apparatus and interaction method thereof, an electronic device, and a storage medium. The data interaction apparatus includes an interaction module, a switch module, a positioning module, a control module, and a drive module. The positioning module is configured to generate positioning information of an interaction object when the interaction object is located in a positioning detection region. The control module determines a corresponding target interaction unit according to the positioning information, and controls a target switch unit corresponding to the target interaction unit to communicate the target interaction unit with the drive module. The drive module drives the target interaction unit to perform data interaction with the interaction object, and sends data interaction information to the control module.

19 Claims, 29 Drawing Sheets

(56) References Cited

FOREIGN PATENT DOCUMENTS

| CN | 112003011 A | 11/2020 |
|---|---|---|
| CN | 112929829 A | 6/2021 |

\* cited by examiner

Act S1: when an interaction object is located in a positioning detection region, positioning information of the interaction object is generated, wherein the positioning detection region is formed by a positioning module, and the positioning module is disposed in an interaction region of an interaction module Act S2: a target switch unit and a target interaction unit corresponding to the positioning information are determined according to the positioning information; wherein the target interaction unit is at least one of multiple interaction units in the interaction module, and the target switch unit is at least one of multiple switch units in a switch module Act S3: the target interaction unit is controlled through the target switch unit to enter an interaction state, the target interaction unit is driven to perform data interaction with the interaction object, and data interaction information from the interaction object is acquired

FIG. 9

DATA INTERACTION APPARATUS AND INTERACTION METHOD THEREOF, ELECTRONIC DEVICE, AND STORAGE MEDIUM

CROSS-REFERENCE TO RELATED APPLICATION

The present application is a U.S. National Phase Entry of International Application No. PCT/CN2021/114850 having an international filing date of Aug. 26, 2021. The entire contents of the above-identified application are hereby incorporated by reference.

Technical Field

The present disclosure relates to, but is not limited to, the field of communication technologies, and in particular, relates to a data interaction apparatus and an interaction method thereof, an electronic device, and a storage medium.

BACKGROUND

A Near Field Communication (NFC) technology has advantages of a fast connection establishment speed, a fast transmission speed, low power consumption, and high security, etc., which not only is dominant in transportation, campuses, and other applications, but also is in the ascendant in the fields of finance, advertising, medical care, Internet of Things, artificial intelligence interaction and so on. At present, a current application of the NFC technology is mainly a small-sized NFC product, and a specific setting manner is that a single NFC interaction chip matches a single antenna, such as mobile payment, a time attendance card, and a campus card.

SUMMARY

The following is a summary of subject matters described herein in detail. The summary is not intended to limit the protection scope of claims.

In one aspect, an embodiment of the present disclosure provides a data interaction apparatus including an interaction module, a switch module, a positioning module, a control module, and a drive module, wherein the interaction module includes multiple interaction units, at least one interaction unit is configured to perform data interaction with an interaction object in an interaction region; the switch module includes multiple switch units corresponding to the multiple interaction units, each switch unit is configured to communicate the interaction module with the drive module under control of the control module; the positioning module is disposed in the interaction region of the interaction module to form a positioning detection region in the interaction region, and is configured to generate positioning information of the interaction object when the interaction object is located in the positioning detection region; the control module is connected with the positioning module and the switch module, and is configured to determine a target switch unit and a target interaction unit corresponding to the positioning information according to the positioning information, and control the target switch unit to communicate the target interaction unit with the drive module; and the drive module is connected with the control module and the switch module, and is configured to drive the target interaction unit to perform data interaction with the interaction object, and send data interaction information from the interaction object to the control module.

In an exemplary implementation mode, the control module is configured to set a resistance-capacitance matching value of the drive module according to the target interaction unit.

In an exemplary implementation mode, the drive module is provided with a resistance-capacitance value adjustment point, and the control module or the drive module stores a resistance-capacitance value matching table; the control module is configured to search a target resistance-capacitance value corresponding to the target interaction unit from the resistance-capacitance value matching table, and adjust the resistance-capacitance value adjustment point according to the target resistance-capacitance value to set a resistance-capacitance matching value of the drive module.

In an exemplary implementation mode, a matching resistance-capacitance circuit is disposed between each of the interaction units and the switch module.

In an exemplary implementation mode, the matching resistance-capacitance circuit includes a first parallel capacitor circuit, a second parallel capacitor circuit, a series resistor circuit, and a parallel resistor circuit; the first parallel capacitor circuit includes a first capacitor and a second capacitor connected in parallel, one terminal is connected with an antenna in the interaction unit, and the other terminal is connected with the series resistor circuit; the second parallel capacitor circuit includes a third capacitor and a fourth capacitor connected in parallel, one terminal is connected with the series resistor circuit, and the other terminal is connected with ground; the series resistor circuit includes a first resistance, one terminal is connected with the first parallel capacitor circuit, and the other terminal is connected with the ground; and the parallel resistor circuit includes a second resistor connected in parallel with the second parallel capacitor circuit.

In an exemplary implementation mode, the drive module includes a drive chip, a filter circuit, a capacitance matching circuit, and a resistance-capacitance circuit; the drive chip is connected with the filter circuit and the resistance-capacitance circuit, and is configured to output a data signal to the filter circuit, receive data interaction information from the resistance-capacitance circuit, and send the data interaction information to the control module; the filter circuit is connected with the drive chip and the capacitance matching circuit, and is configured to filter the data signal and send the filtered data signal to the capacitance matching circuit; the capacitance matching circuit is connected with the filter circuit, the resistance-capacitance circuit, and the switch module, and is configured to adjust the filtered data signal, send the adjusted data signal to the switch module, receive data interaction information from the switch module, and send the data interaction information to the resistance-capacitance circuit; and the resistance-capacitance circuit is connected with the drive chip and the capacitance matching circuit, and is configured to receive data interaction information from the capacitance matching circuit, adjust the data interaction information, and send the adjusted data interaction information to a signal receiving terminal of the drive chip.

In an exemplary implementation mode, the drive module may include a differential-to-single terminal circuit, the differential-to-single terminal circuit includes a first signal channel and a second signal channel; the filter circuit includes a first filter sub-circuit and a second filter sub-circuit; the capacitance matching circuit includes a first capacitance matching sub-circuit and a second capacitance matching sub-circuit; the drive chip includes a first signal output terminal, a second signal output terminal, and a signal receiving terminal; the first filter sub-circuit includes a first inductor and a fifth capacitor; one terminal of the first inductor is connected with the first signal output terminal of the drive chip, and the other terminal is connected with the fifth capacitor; one terminal of the fifth capacitor is connected with the first inductor and the first capacitance matching sub-circuit, and the other terminal is connected with ground; the second filter sub-circuit includes a second inductor and a sixth capacitor; one terminal of the second inductor is connected with the second signal output terminal of the drive chip, and the other terminal is connected with the sixth capacitor; one terminal of the sixth capacitor is connected with the second inductor and the second capacitance matching sub-circuit, and the other terminal is connected with the ground; the first capacitance matching sub-circuit includes a seventh capacitor, one terminal of the seventh capacitor is connected with the first filter sub-circuit and the resistance-capacitance circuit, and the other terminal is connected with the first signal channel of the differential-to-single terminal circuit; the second capacitance matching sub-circuit includes an eighth capacitor, one terminal of the eighth capacitor is connected with the second filter sub-circuit, and the other terminal is connected with the second signal channel of the differential-to-single terminal circuit; in the differential-to-single terminal circuit, one terminal of the first signal channel is connected with the first capacitance matching sub-circuit, and the other terminal is connected with the switch module; one terminal of the second signal channel is connected with the second capacitance matching sub-circuit, and the other terminal is connected with the ground; the differential-to-single terminal circuit is configured to process data signals of two signal channels into a single-way signal and send the single-way signal to the switch module, receive data interaction information from the switch module, and send the data interaction information to the resistance-capacitance circuit through the first signal channel; the resistance-capacitance circuit includes a ninth capacitor, a third resistor, a tenth capacitor, and a fourth resistor; one terminal of the ninth capacitor is connected with the third resistor, and the other terminal is connected with the ground; one terminal of the third resistor is connected with the ninth capacitor, and the other terminal is connected with the signal receiving terminal of the drive chip and the tenth capacitor; one terminal of the tenth capacitor is connected with the signal receiving terminal of the drive chip, and the other terminal is connected with the fourth resistor; one terminal of the fourth resistor is connected with the tenth capacitor, and the other terminal is connected with the first capacitance matching sub-circuit; the resistance-capacitance circuit is configured to adjust data interaction information from the first capacitance matching sub-circuit and send the adjusted data interaction information to the signal receiving terminal of the drive chip.

In an exemplary implementation mode, one terminal of the ninth capacitor connected with the third resistor is connected with a power supply. In an exemplary implementation mode, the drive chip may include a voltage output pin and the voltage output pin is connected to the ninth capacitor and the third resistor; or, one terminal of the ninth capacitor connected with the third resistor is connected with an external power supply.

In an exemplary implementation mode, the data interaction apparatus may further include a display module; the control module may be connected with the display module and is configured to control the display module to display according to the data interaction information; and the display module is connected with the control module and is configured to display under control of the control module.

In an exemplary implementation mode, the interaction module is configured as multiple film layers, and each of the interaction units includes an antenna coil; in the interaction module, antenna coils of two adjacent interaction units are located in different film layers, and there is an overlapping region in orthographic projections of regions enclosed by the antenna coils of the two adjacent interaction units on a plane where one of the film layers is located.

In an exemplary implementation mode, the interaction module is configured as four film layers, antenna coils in four adjacent interaction units are respectively disposed on the four film layers, there is a first overlapping region in orthographic projections of regions enclosed by antenna coils of two adjacent interaction units on a plane where one of the film layers is located, and there is a second overlapping region in orthographic projections of regions enclosed by antenna coils of the four adjacent interaction units on a plane where one of the film layers is located.

In an exemplary implementation mode, a rectangular winding manner is adopted for antenna coils in the interaction units; a length of a first overlapping region formed by antenna coils arranged along a second direction, along the second direction, does not exceed ⅙ of a length of a side length of a single antenna coil along the second direction; a length of a first overlapping region formed by antenna coils arranged along a first direction, along the first direction, does not exceed ⅙ of a length of a side length of a single antenna coil along the first direction; a length of a second overlapping region along the first direction does not exceed ⅙ of the length of the side length of the single antenna coil along the first direction; and a length of a second overlapping region along the second direction does not exceed ⅙ of the length of the side length of the single antenna coil along the second direction.

In an exemplary implementation mode, the four film layers include a first film layer, a second film layer, a third film layer, and a fourth film layer arranged in a stack, and antenna coils in four adjacent interaction units are respectively a first coil, a second coil, a third coil, and a fourth coil; multiple first coils are arranged at intervals on the first film layer in an array manner along the first direction and the second direction; multiple second coils are arranged at intervals on the second film layer in an array manner along the first direction and the second direction; multiple third coils are arranged at intervals on the third film layer in an array manner along the first direction and the second direction; and multiple fourth coils are arranged at intervals on the fourth film layer in an array manner along the first direction and the second direction.

In an exemplary implementation mode, the interaction module is configured as a single film layer, and each of the interaction units includes an antenna coil; antenna coils of two adjacent interaction units arranged in a stack, an insulation layer is provided between stacked layers where the antenna coils of the two adjacent interaction units are located, and there is an overlapping region in orthographic projections of regions enclosed by the antenna coils of the two adjacent interaction units on a plane where one of the stacked layers is located.

In an exemplary implementation mode, antenna coils of the multiple interaction units are configured as four stacked layers, antenna coils in four adjacent interaction units are respectively disposed on the four stacked layers, there is a third overlapping region in orthographic projections of regions enclosed by antenna coils of two adjacent interaction units on a plane where one of the stacked layers is located, and there is a fourth overlapping region in orthographic projections of regions enclosed by the antenna coils of the four adjacent interaction units on the plane where one of the stacked layers is located.

In an exemplary implementation mode, a rectangular winding manner is adopted for antenna coils in the interaction units; a length of a third overlapping region formed by antenna coils arranged along a second direction, along the second direction, does not exceed $1/6$ of a length of a side length of a single antenna coil along the second direction; a length of a third overlapping region formed by antenna coils arranged along a first direction, along the first direction, does not exceed $1/6$ of a length of a side length of a single antenna coil along the first direction; a length of a fourth overlapping region along the first direction does not exceed $1/6$ of the length of the side length of the single antenna coil along the first direction; and a length of a fourth overlapping region along the second direction does not exceed $1/6$ of the length of the side length of the single antenna coil along the second direction.

In an exemplary implementation mode, the four stacked layers include a first stacked layer, a second stacked layer, a third stacked layer, and a fourth film layer arranged in a stack, and antenna coils in four adjacent interaction units are respectively a first coil, a second coil, a third coil, and a fourth coil; multiple first coils are arranged at intervals on the first stacked layer in an array manner along a first direction and a second direction; multiple second coils are arranged at intervals on the second stacked layer in an array manner along the first direction and the second direction; multiple third coils are arranged at intervals on the third stacked layer in an array manner along the first direction and the second direction; and multiple fourth coils are arranged at intervals on the fourth stacked layer in an array manner along the first direction and the second direction, wherein a first insulation layer is provided between the first stacked layer and the second stacked layer, a second insulation layer is provided between the second stacked layer and the third stacked layer, and a third insulation layer is provided between the third stacked layer and the fourth stacked layer.

In an exemplary implementation mode, the drive module includes a drive module layer, the display module includes a display module layer, and the positioning module includes a positioning module layer; the drive module layer, the display module layer, and the positioning module layer are sequentially disposed along a third direction, and the positioning module layer includes multiple infrared receiving terminals and multiple infrared emitting terminals set in one-to-one correspondence with the multiple infrared receiving terminals; or, the interaction apparatus may include a protection layer, the positioning module layer is disposed between the protection layer and the display module layer, the positioning module layer includes a total reflection transparent material, multiple infrared receiving terminals, and multiple infrared emitting terminals set in one-to-one correspondence with the multiple infrared receiving terminals, and the multiple infrared emitting terminals and the multiple infrared receiving terminals are disposed in the total reflection transparent material; or, the display module layer includes a display substrate and a filter element which are oppositely disposed, the display substrate is provided with multiple photosensitive elements, the positioning module layer includes the multiple photosensitive elements, and the multiple photosensitive elements and orthographic projections of multiple photosensitive regions on the filter element on the display substrate are at least partially overlapped.

In an exemplary implementation mode, the switch module includes a main switch module and a sub switch module, wherein the main switch module includes multiple main switch units, each main switch unit is connected with the control module, the drive module, and at least one sub switch unit in the sub switch module; the sub switch module includes multiple sub switch units, each of which is connected with the control module, a main switch unit, and an interaction unit; the control module is connected with the positioning module, the multiple main switch units and the multiple sub switch units in the switch module, and is configured to determine a sub switch unit and a target interaction unit corresponding to the positioning information according to the positioning information, use the determined sub switch unit as the target switch unit, and control the target switch unit and a main switch unit corresponding to the target switch unit to communicate the target interaction unit with the drive module; and the drive module is connected with the control module and the multiple main switch units in the main switch module, and is configured to drive the target interaction unit to perform data interaction with the interaction object under control of the control module.

In another aspect, the present disclosure provides an electronic device, including the data interaction apparatus according to any one of the aforementioned embodiments.

In another aspect, the present disclosure provides a data interaction method, which is applied to the data interaction apparatus described in any one of the aforementioned embodiments. The method includes: generating positioning information of an interaction object when the interaction object is located in a positioning detection region; wherein the positioning detection region is formed by a positioning module, and the positioning module is disposed in an interaction region of an interaction module; determining a target switch unit and a target interaction unit corresponding to the positioning information according to the positioning information; wherein the target interaction unit is at least one of multiple interaction units in the interaction module, and the target switch unit is at least one of multiple switch units in a switch module; and controlling the target interaction unit through the target switch unit to enter an interaction state, driving the target interaction unit to perform data interaction with the interaction object, and acquiring data interaction information from the interaction object.

In an exemplary implementation mode, the method may further include: setting a resistance-capacitance matching value according to the target interaction unit.

In yet another aspect, the present disclosure provides a non-transitory computer-readable storage medium configured to store computer program instructions, wherein when the computer program instructions are executed, the data interaction method according to any one of the aforementioned embodiments is implemented.

Other features and advantages of the embodiments of the present disclosure will be set forth in the following specification, and in part will be apparent from the specification, or may be learned by practice of the embodiments of the present disclosure. Other advantages of the embodiments of the present disclosure may be achieved and obtained through solutions described in the specification and drawings.

After reading and understanding the drawings and detailed description, other aspects may be understood.

BRIEF DESCRIPTION OF DRAWINGS

Accompanying drawings are used for providing further understanding for technical solutions of the present disclosure, constitute a part of the specification, and are used for explaining the technical solutions of the present disclosure together with embodiments of the present disclosure, thus do not constitute a limitation on the technical solutions of the present disclosure. A shape and a size of each component in the drawings do not reflect actual scales, and are only intended to schematically illustrate contents of the present disclosure.

FIG. 9 is a flowchart of a data interaction method in an embodiment of the present disclosure.

DETAILED DESCRIPTION

Figure 1A:
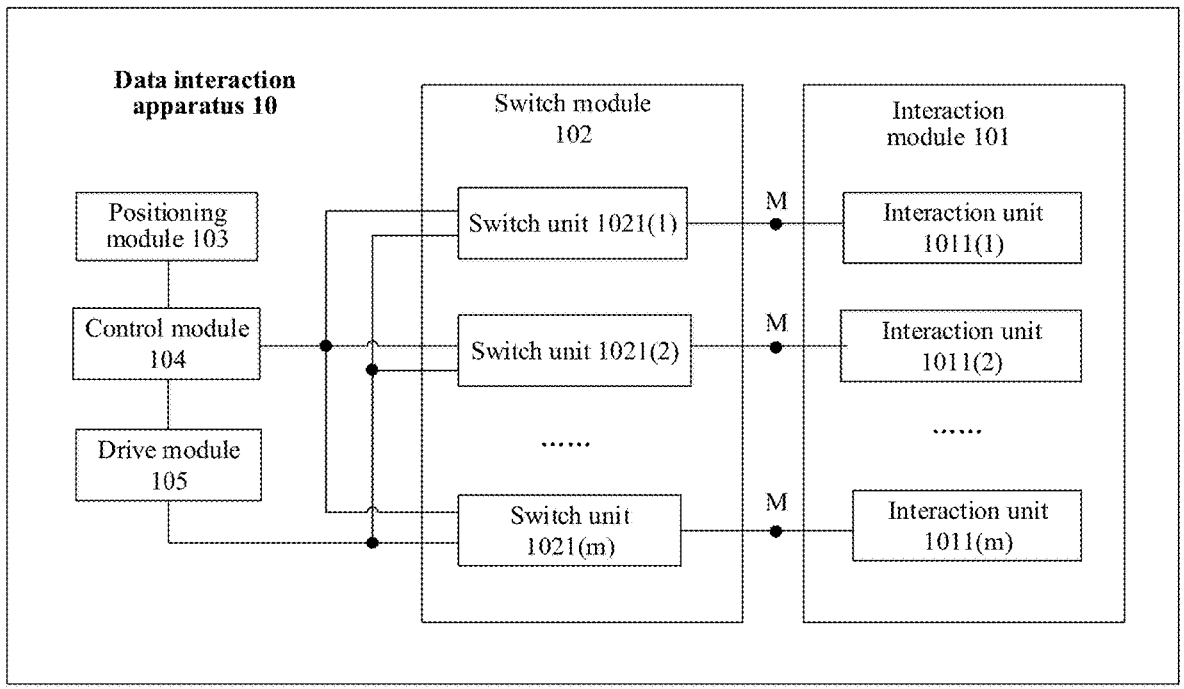
FIGS. 1a and 1b are block diagrams of modules of a data interaction apparatus according to an embodiment of the present disclosure.

The embodiments of the present disclosure will be described in detail below with reference to the drawings. Implementation modes may be implemented in multiple different forms. Those of ordinary skills in the art may easily understand such a fact that modes and contents may be transformed into various forms without departing from the spirit and scope of the present disclosure. Therefore, the present disclosure should not be explained as being limited to contents described in following implementation modes only. The embodiments in the present disclosure and features in the embodiments may be combined randomly with each other if there is no conflict. In order to keep following description of the embodiments of the present disclosure clear and concise, detailed descriptions about part of known functions and known components are omitted in the present disclosure. The drawings of the embodiments of the present disclosure only involve structures involved in the embodiments of the present disclosure, and other structures may refer to conventional designs.

A scale of the drawings in the present disclosure may be used as a reference in an actual process, but is not limited thereto. For example, a width-to-length ratio of a channel, a thickness and spacing of every film layer, and a width and spacing of every signal line may be adjusted according to an actual situation. A quantity of pixels in a display substrate and a quantity of sub-pixels in each pixel may not be limited to a quantity shown in the drawings. The drawings described in the present disclosure are schematic structure diagrams only, and one mode of the present disclosure is not limited to shapes, numerical values or the like shown in the drawings.

Ordinal numerals such as "first", "second", and "third" in the specification are set to avoid confusion of constituent elements, but not to set a limit in quantity.

In the specification, for convenience, wordings indicating directional or positional relationships, such as "center", "upper", "lower", "front", "back", "vertical", "horizontal", "top", "bottom", "inside", and "outside", are used for illustrating positional relationships between constituent elements with reference to the drawings, and are merely for facilitating the description of the specification and simplifying the description, rather than indicating or implying that a referred apparatus or element must have a particular orientation and be constructed and operated in the particular orientation. Therefore, they cannot be understood as limitations on the present disclosure. The positional relationships between the constituent elements may be changed as appropriate according to a direction according to which each constituent element is described. Therefore, the wordings are not limited in the specification, and may be replaced appropriately according to a situation.

In the specification, unless otherwise specified and defined explicitly, terms "mount", "mutually connect", and "connect" should be understood in a broad sense. For example, a connection may be a fixed connection, or a detachable connection, or an integrated connection. It may be a mechanical connection or an electrical connection. It may be a direct mutual connection, or an indirect connection through middleware, or internal communication between two elements. Those of ordinary skill in the art may understand specific meanings of these terms in the present disclosure according to a specific situation.

In the specification, the "electrical connection" includes a case that constituent elements are connected together through an element having some electrical function. The "element having some electrical function" is not particularly limited as long as electrical signals may be sent and received between the connected constituent elements. Examples of the "element having some electrical function" not only include an electrode and a wiring, but also a switch element such as a transistor, a resistor, an inductor, a capacitor, another element having one or more functions, and the like.

In the specification, "parallel" refers to a state in which an angle formed by two straight lines is −10° or more and 10° or less, and thus may include a state in which the angle is −5° or more and 5° or less. In addition, "perpendicular" refers to a state in which an angle formed by two straight lines is 80° or more and 100° or less, and thus may include a state in which the angle is 85° or more and 95° or less.

In the specification, a "film" and a "layer" are interchangeable. For example, a "conductive layer" may be replaced with a "conductive film" sometimes. Similarly, an "insulation film" may be replaced with an "insulation layer" sometimes.

In the specification, a triangle, rectangle, trapezoid, pentagon, or hexagon is not in a strict sense, but may be an approximate triangle, rectangle, trapezoid, pentagon, or hexagon, etc. There may be some small deformations caused by tolerances, and there may be a guide angle, an arc edge, and deformation, etc.

In the present disclosure, "about" refers to that a boundary is defined not so strictly and numerical values within process and measurement error ranges are allowed.

In applications of the NFC technology in large-size or large-area NFC products, a quantity of objects interacting with the NFC products is also increased accordingly. At present, there are two ways for the NFC products to interact with multiple interaction objects. One design approach is that a single NFC interaction chip matches multiple antennas, and the NFC chip starts reading and writing operations of each antenna in a polling mode. Since multiple antennas matched with the NFC chip needs to be opened every time for data interaction, it takes more time and reduces an efficiency of NFC data interaction. The other design approach is to set multiple NFC chips and multiple antennas in a large-size or large-area product, each NFC chip is matched with one antenna. Although a data interaction efficiency of the NFC products is improved in this setting method, power consumption is relatively high since multiple NFC chips need to be run at the same time or successively, and the multiple NFC chips also increase a production cost of a product.

An embodiment of the present disclosure provides a data interaction apparatus. As shown in FIG. 1a, the data interaction apparatus 10 includes an interaction module 101, a switch module 102, a positioning module 103, a control module 104, and a drive module 105.

The interaction module 101 includes multiple interaction units 1011, at least one of which is configured to perform data interaction with an interaction object in an interaction region.

The switch module 102 includes multiple switch units 1021 corresponding to the multiple interaction units 1011; each switch unit 1021 is configured to communicate the interaction module 101 with the drive module 105 under control of the control module 104.

The positioning module 103 is arranged in the interaction region of the interaction module 101 to form a positioning detection region in the interaction region, and is configured to generate positioning information of the interaction object when the interaction object is located in the positioning detection region.

The control module 104 is connected with the positioning module 103 and the switch module 102, and is configured to determine a target switch unit and a target interaction unit corresponding to the positioning information according to the positioning information, and control the target switch unit to communicate the target interaction unit with the drive module 105.

The drive module 105 is connected with the control module 104 and the switch module 102, and is configured to drive the target interaction unit to perform data interaction with the interaction object, and send data interaction information from the interaction object to the control module 104.

According to the data interaction apparatus of the embodiment of the present disclosure, the positioning information of the interaction object is fed back to the control module through the positioning module. The control module determines the corresponding target interaction unit according to the positioning information, and controls the target switch unit corresponding to the target interaction unit to communicate the target interaction unit with the drive module. The drive module drives the target interaction unit to perform data interaction with the interaction object under control of the control module. When the interaction unit is required to interact with the interaction object, only an interaction switch in a region corresponding to the interaction object is turned on, and the drive module is not required to turn on each interaction unit in turn through polling, thus saving time of data interaction and improving an efficiency of data interaction. Multiple interaction units are driven through only one drive module, so that a cost may be saved. When interacting with an interaction object, only one drive module runs, which can reduce power consumption.

In an exemplary implementation mode, as shown in FIG. 1a, the switch module 102 may include multiple switch units 1021, each switch unit 1021 is connected with the control module 104 and the drive module 105. For example, the switch module 102 includes m switch units 1021 where m is a positive integer.

Figure 1B:
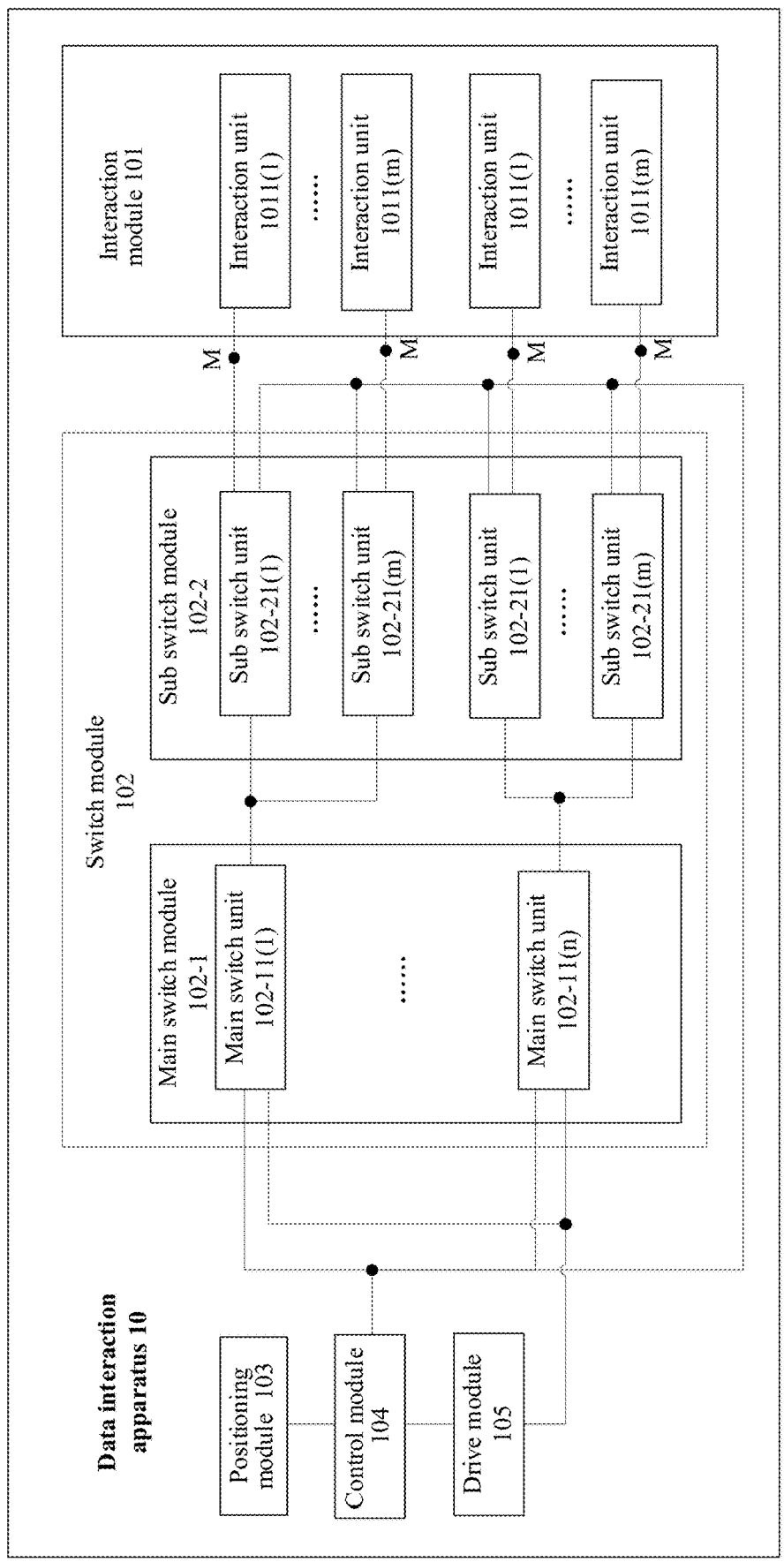

In an exemplary implementation mode, as shown in FIG. 1b, the switch module 102 may include a main switch module 102-1 and a sub switch module 102-2.

The main switch module 102-1 includes multiple main switch units 102-11, and each main switch unit 102-11 is connected with the control module 104, the drive module 105, and at least one sub switch unit in the sub switch module.

The sub switch module 102-2 includes multiple sub switch units 102-21, each sub switch unit 102-21 is connected with the control module 104, a main switch unit 102-11, and an interaction unit 1011.

The control module 104 is connected with the positioning module 103, the multiple main switch units 102-11 and the multiple sub switch units 102-2 in the switch module 104, and is configured to determine a sub switch unit 102-21 and a target interaction unit corresponding to positioning information according to the positioning information, use the determined sub switch unit 102-21 as a target switch unit, and control the target switch unit and a main switch unit corresponding to the target switch unit to communicate the target interaction unit with the drive module 105.

The drive module 105 is connected with the control module 104, the multiple main switch units 102-11 in and the main switch module 102-1, and is configured to drive the target interaction unit to perform data interaction with an interaction object, and send data interaction information from the interaction object to the control module 104.

In a structure shown in FIG. 1b, each main switch unit 102-11 in the switch module 102 is connected with multiple sub switch units 102-21, the control module 104 is connected with multiple sub switch units 102-21 and multiple main switch units 102-11, the drive module 105 is only connected with multiple main switch units 102-11, and the drive module 105 does not need to be directly electrically connected with multiple sub switch units 102-21, thereby facilitating a wiring and saving wiring space and a wiring cost. For example, in the structure shown in FIG. 1b, if the main switch module 102-1 includes n main switch units 102-11 and m sub switch units 102-21, a total number of switch units is n*m, both m and n are positive integers, thereby saving n*m connection lines between the drive module 105 and the sub switch units 102-21, greatly reducing wiring space and saving a wiring cost.

In an exemplary implementation mode, the aforementioned switch unit 1021, the main switch unit 102-11, and the sub switch unit 102-21 may be Radio Frequency Switches (RF Switches for short), or other switches, which is not limited in the present disclosure.

In an exemplary implementation mode, when the positioning information fed back by the positioning module 103 to the control module 104 includes multiple corresponding target interaction units and target switches, the drive module 105 may turn on target switch units in turn to control the target interaction units to perform data interaction with an interaction object. When the drive module 105 controls the target interaction units to perform data interaction with the interaction object, when one or several target interaction units do not detect the interaction object, a next target interaction unit is controlled to perform data interaction with the interaction object.

Figure 2A:
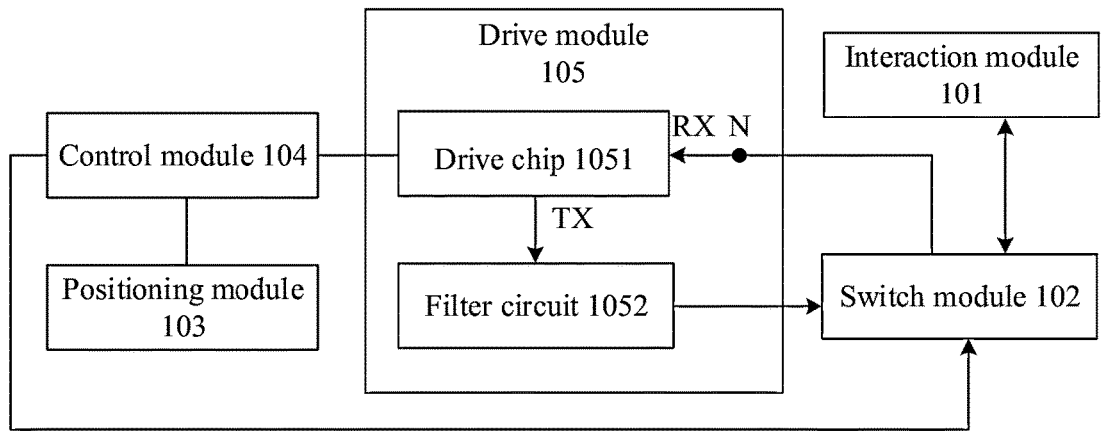
FIGS. 2a to 2c are block diagrams of modules of a data interaction apparatus according to an exemplary embodiment of the present disclosure.

In an exemplary implementation mode, as shown in FIG. 2a, the drive module 105 includes a drive chip 1051 and a filter circuit 1052.

The drive chip 1051 is connected with the control module 104, the filter circuit 1052, and the switch module 102, and is configured to send a data signal to the filter circuit 1052 for filtering, receive data interaction information from the interaction module 101 through the switch module 102, and send the data interaction information from an interaction object to the control module 104.

The filter circuit 1052 is connected with the drive chip 1051 and the switch module 102, and is configured to filter the data signal from the drive chip 1051 and send the filtered data signal to the interaction module 101 via the switch module 102.

Figure 2B:
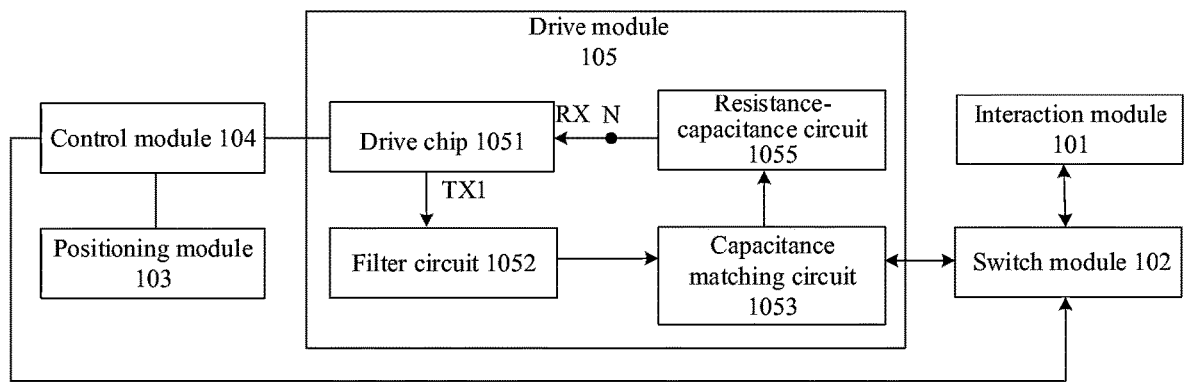

In an exemplary implementation mode, as shown in FIG. 2b, the drive module 105 may include a capacitance matching circuit 1053 and a resistance-capacitance circuit 1055.

The capacitance matching circuit 1053 is connected with the filter circuit 1052 and the switch module 102, and is configured to adjust the filtered data signal from the filter circuit 1052, send the adjusted data signal to a data interaction module via the switch module 102, and send data interaction information from the switch module 102 to the resistance-capacitance circuit 1055.

The resistance-capacitance circuit 1055 is connected with the drive chip 1051 and the capacitance matching circuit 1053, and is configured to adjust the data interaction information from the capacitance matching circuit 1053 and send the adjusted data interaction information to a signal receiving terminal of the drive chip 1051.

Figure 2C:
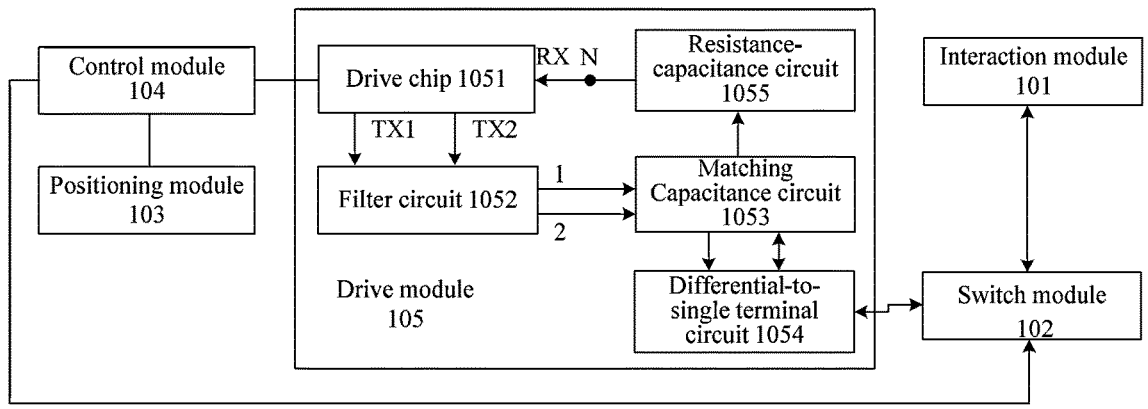

In an exemplary implementation mode, as shown in FIG. 2c, based on FIG. 2a, the drive module 105 may include a capacitance matching circuit 1053, a differential-to-single terminal circuit 1054, and a resistance-capacitance circuit 1055.

The drive chip 1051 includes two signal output terminals connected with the filter circuit 1052 and a signal receiving terminal connected with the resistance-capacitance circuit 1055, and is configured to output two-way data signals to the filter circuit 1052 through the two signal output terminals, receive data interaction information from the resistance-capacitance circuit 1055 through the signal receiving terminal, and send the data interaction information to the control module 104.

The filter circuit 1052 includes two filter sub-circuits, one terminal of the two filter sub-circuits is respectively connected with the two signal output terminals of the drive chip 1051, and the other terminal is respectively connected with the capacitance matching circuit 1053, and is configured to filter the two-way data signals from the drive chip 1051 and send the filtered two-way data signals to the capacitance matching circuit 1053.

The capacitance matching circuit 1053 is connected with the filter circuit 1052, the differential-to-single terminal circuit 1054, and the resistance-capacitance circuit 1055, and is configured to send the filtered two-way data signals to the differential-to-single terminal circuit 1054 and transmit data interaction information from the differential-to-single terminal circuit 1054 to the resistance-capacitance circuit 1055.

The differential-to-single terminal circuit 1054 is connected with the capacitance matching circuit 1053 and the switch module 102, and is configured to process the two-way data signals into a single-way signal and send the single-way signal to the switch module 102 and send data interaction information from a target interaction unit 101 to the capacitance matching circuit 1053.

In structures shown in FIGS. 2b and 2c, the drive module 105 is provided with the capacitance matching circuit 1053 and the resistance-capacitance circuit 1055. Energy of data signals emitted by transmitting terminals TX1 and TX2 of the drive module 105 may be adjusted by adjusting a capacitance value in the capacitance matching circuit 1053. Energy of a received signal at a receiving terminal RX of the drive module 105 is adjusted by adjusting values of a resistance and a capacitance in the resistance-capacitance circuit 1055. When an application scenario of the data interaction apparatus is changed and field strength energy for data interaction with a data interaction object is changed, energy of signals emitted and received by the drive module 105 may be adjusted by adjusting resistance and capacitance elements in the capacitance matching circuit 1053 and the resistance-capacitance circuit 1055, so that the entire data interaction apparatus does not need to be replaced and only a capacitance value of the capacitance matching circuit 1053 and a resistance-capacitance value of the resistance-capacitance circuit 1055 in the drive module 105 may be adjusted.

Figure 2D:
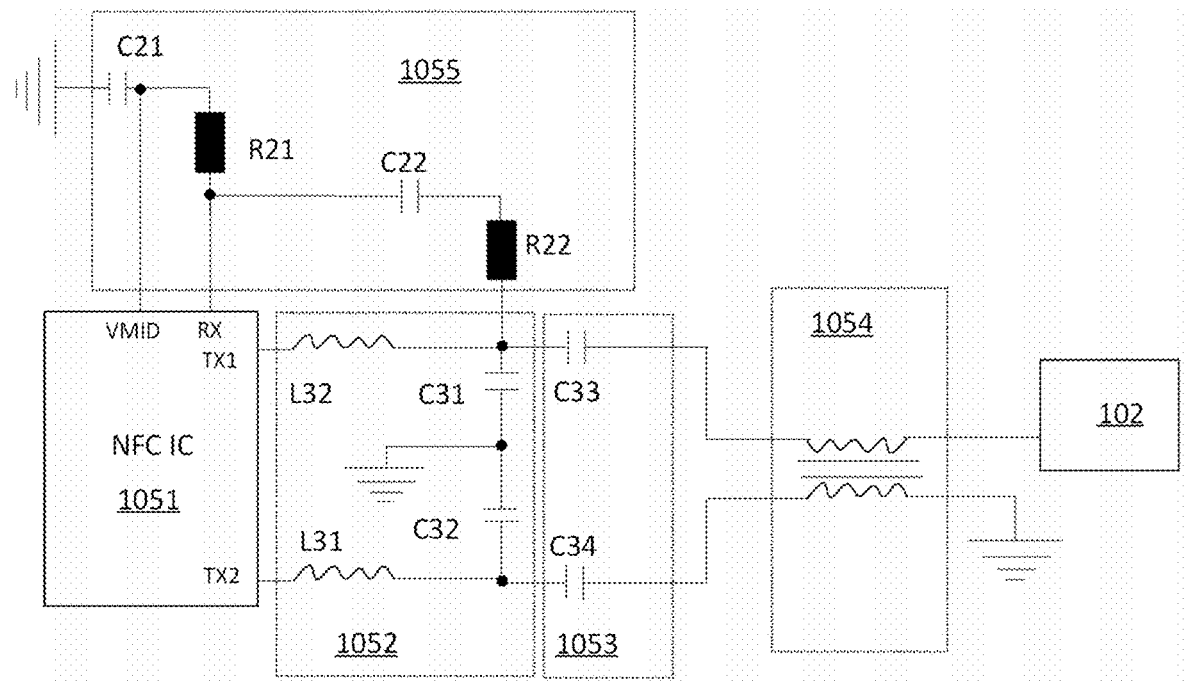
FIG. 2d is a schematic circuit diagram of a drive module according to an exemplary embodiment of the present disclosure.

In an exemplary implementation mode, the aforementioned filter circuit 1052 may include a capacitor and an inductor, the aforementioned capacitance matching circuit 1053 may include a matching capacitor, and the resistance-capacitance circuit 1055 may include a capacitor and a resistor in series. FIG. 2d shows a schematic circuit diagram of the drive chip 1051, the filter circuit 1052, the capacitance matching circuit 1053, and the resistance-capacitance circuit 1055. In FIG. 2d, the resistor and capacitor in the resistance-capacitance circuit 1055 may be increased or decreased according to an actual situation, and a quantity of capacitors in the capacitance matching circuit 1053 may be increased according to an actual situation, for example, a grounding capacitor may be added to the capacitance matching circuit 1053. The filter circuit 1052, the capacitance matching circuit 1053, the resistance-capacitance circuit 1055, and the differential-to-single terminal circuit 1054 may be provided in other ways, which are not limited in the present disclosure.

In an exemplary implementation mode, as shown in FIG. 2d, the differential-to-single terminal circuit 1054 includes a first signal channel and a second signal channel. The filter circuit 1052 includes a first filter sub-circuit and a second filter sub-circuit. The capacitance matching circuit 1053 includes a first capacitance matching sub-circuit and a second capacitance matching sub-circuit. The drive chip 1051 includes a first signal output terminal TX1, a second signal output terminal TX2, and a signal receiving terminal RX.

The first filter sub-circuit includes a first inductor L32 and a fifth capacitor C31; one terminal of the first inductor L32 is connected with the first signal output terminal TX1 of the drive chip 1051, and the other terminal is connected with the fifth capacitor C31; one terminal of the fifth capacitor C31 is connected with the first inductor L32 and the first capacitance matching sub-circuit, and the other terminal is connected with the ground.

The second filter sub-circuit includes a second inductor L31 and a sixth capacitor C32; one terminal of the second inductor L31 is connected with the second signal output terminal TX2 of the drive chip 1051, and the other terminal is connected with the sixth capacitor C32; one terminal of the sixth capacitor C32 is connected with the second inductor L31 and the second capacitance matching sub-circuit, and the other terminal is connected with the ground.

The first capacitance matching sub-circuit includes a seventh capacitor C33, one terminal of the seventh capacitor C33 is connected with the first filter sub-circuit and the resistance-capacitance circuit 1055, and the other terminal is connected with the first signal channel of the differential-to-single terminal circuit 1054.

The second capacitance matching sub-circuit includes an eighth capacitor C34, one terminal of the eighth capacitor C34 is connected with the second filter sub-circuit, and the other terminal is connected with the second signal channel of the differential-to-single terminal circuit 1054.

In the differential-to-single terminal circuit 1054, one terminal of the first signal channel is connected with the first capacitance matching sub-circuit, and the other terminal is connected with the switch module 102; one terminal of the second signal channel is connected with the second capacitance matching sub-circuit, and the other terminal is connected with the ground; the differential-to-single terminal circuit 1054 is configured to process data signals of the two signal channels into a single-way signal and send the single-way signal to the switch module 102; receive data interaction information from the switch module 102, and send the data interaction information to the resistance-capacitance circuit 1055 through the first signal channel.

The resistance-capacitance circuit 1055 includes a ninth capacitor C21, a third resistor R21, a tenth capacitor C22, and a fourth resistor R22; one terminal of the ninth capacitor C21 is connected with the third resistor R21, and the other terminal is connected with the ground. One terminal of the third resistor R21 is connected with the ninth capacitor C21, and the other terminal is connected with the signal receiving terminal RX of the drive chip 1051 and the tenth capacitor C22; one terminal of the tenth capacitor C22 is connected with the signal receiving terminal RX of the drive chip 1051 and the third resistor R21, and the other terminal is connected with the fourth resistor R22; one terminal of the fourth resistor R22 is connected with the tenth capacitor C22, and the other terminal is connected with the first capacitance matching sub-circuit. The resistance-capacitance circuit 1055 is configured to adjust data interaction information from the first capacitance matching sub-circuit and send the adjusted data interaction information to the signal receiving terminal RX of the drive chip 1051.

In an exemplary implementation mode, in the schematic circuit diagram shown in FIG. 2d, the drive chip 1051 may include a voltage output pin VMID connected with the ninth capacitor C21 and the third resistor R21 to supply a voltage to the signal receiving terminal RX. In an exemplary implementation mode, a voltage may be supplied to the ninth capacitor C21, the third resistor R21, and the signal receiving terminal RX through an external power supply instead of the voltage output pin VMID of the drive chip 1051.

In an exemplary implementation mode, a value of the seventh capacitor C33 ranges from 150 pF to 470 pF; in some implementation modes, a value of the eighth capacitor C34 ranges from 150 pF to 470 pF.

In an exemplary implementation mode, in the schematic circuit diagram shown in FIG. 2d, the two output terminals TX1 and TX2 of the drive chip 1051 respectively send data signals to two filter sub-circuits. One filter sub-circuit includes an inductor L31 and a capacitor C32 connected in series, and the other filter sub-circuit includes an inductor L32 and a capacitor C31 connected in series. The differential-to-single terminal circuit 1054 receives the filtered two-way data signals, and the filtered two-way data signals are converted into a single-way signal after signal processing and sent to an interaction unit 1011. When the differential-to-single terminal circuit 1054 receives data interaction information from the interaction unit, the data interaction information is sent to the drive chip 1051 through the resistance-capacitance circuit 1055 through one of two terminals connected with the two sub-filter circuits, and the other terminal may be configured to be connected with the ground. In an exemplary embodiment, the differential-to-single terminal circuit 1054 may include a Balance-unbalance (Balun) transformer which may be referred to simply as a Balun transformer.

In an exemplary implementation mode, when energy of the receiving terminal RX of the drive chip 1051 is adjusted, the resistance-capacitance circuit 1055 may set the ninth capacitor C21 and the tenth capacitor C22 to fixed values, and the energy of the receiving terminal RX is adjusted by adjusting resistance values of the third resistor R21 and the fourth resistor R22. In an exemplary implementation mode, a resistance value of the third resistor R21 is directly proportional to energy received by the receiving terminal RX, and a resistance value of the fourth resistor R22 is inversely proportional to energy received by the receiving terminal RX, wherein the energy received by the receiving terminal RX may be characterized by a peak-to-peak value of a sine wave.

In some exemplary implementation modes, the energy received by the receiving terminal RX of the drive chip 1051 may be adjusted by adjusting at least one of the ninth capacitor C21, the tenth capacitor C22, the third resistor R21, and the fourth resistor R22. A capacitance value of the ninth capacitor C21 is inversely proportional to the energy received by the receiving terminal RX, a capacitance value of the tenth capacitor C22 is directly proportional to the energy received by the receiving terminal RX, a resistance value of the third resistor R21 is directly proportional to the energy received by the receiving terminal RX, and a resistance value of the fourth resistor R22 is inversely proportional to the energy received by the receiving terminal RX.

In an exemplary implementation mode, a circuit or a chip capable of achieving a corresponding function in the related art may be adopted for the drive chip 1051, the filter circuit 1052, the capacitance matching circuit 1053, the resistance-capacitance circuit 1055, and the differential-to-single terminal circuit 1054.

In an exemplary implementation mode, in the structure shown in FIG. 2c, the drive chip 1051 emits data signals through two signal output terminals TX1 and TX2, so that an emission power may be enhanced. Correspondingly, the filter circuit 1052 and the capacitance matching circuit 1053 may have two input terminals and two output terminals, and two-way signals are transformed into a single-way signal through the differential-to-single terminal circuit 1054 and sent to the data interaction module 101 via the switch module 102. The drive chip 1051 may be provided with only one signal output terminal TX according to an actual situation, for example, when an output power of one signal output terminal TX of the drive chip 1051 is high enough, as shown in FIGS. 2a and 2b, and correspondingly the differential-to-single terminal circuit 1054 may not be used.

In an exemplary implementation mode, in a structure in which two signal output terminals TX1 and TX2 are provided in the drive chip 1051 in the drive module 105, data signals sent from the two signal output terminals TX1 and TX2 are filtered by the filter circuit 1052 to obtain two sine waves. In an exemplary implementation mode, a frequency of a square wave signal sent by the two signal output terminals TX1 and TX2 of the drive chip 1051 is 13.56 Mega Hertz (MHz for short), and the square wave signal becomes a sine wave of 13.56 MHz after filtering out high frequency harmonics by the filter circuit 1052.

In an exemplary implementation mode, the control module 104 may be a System On chip (SOC) or a Microcontroller Unit (MCU), and the drive chip 1051 may be an NFC chip. A chip capable of achieving a corresponding function in the related art may be adopted for the drive chip 1051 and the control module.

There are many protocols for NFC object recognition, such as ISO14443 Type A and Type B/ISO15693. In ISO14443A, amplitude discrimination is used for exchanging information, which may be applied to a design and debugging of a single NFC chip to recognize multiple objects.

In an exemplary implementation mode, each interaction unit 1011 may include an antenna coil.

In an exemplary implementation mode, the drive chip 1051 may perform data interaction with an interaction object based on the ISO14443A protocol. A working principle of the drive module 105 driving the interaction module 101 to perform data interaction with an interaction object is described below.

Figure 3A:
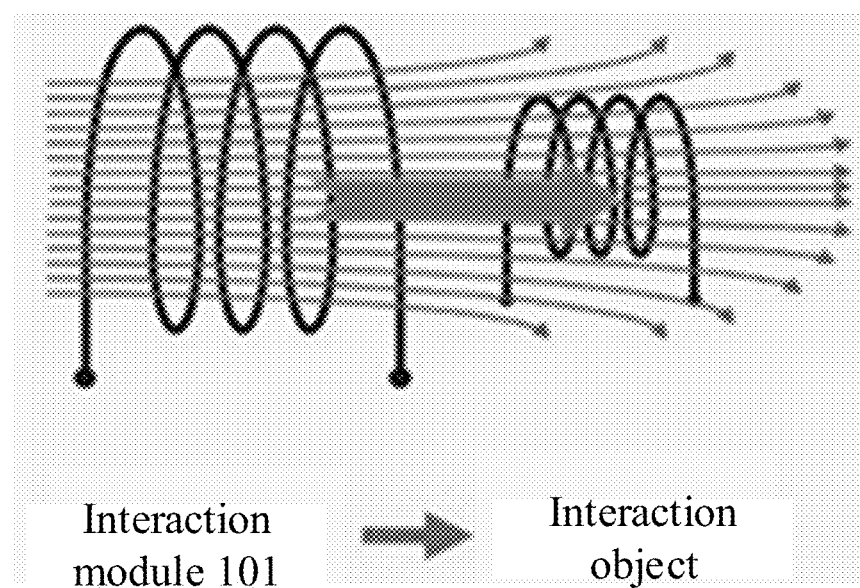
FIGS. 3a to 3c are schematic structural diagrams of data interaction between an interaction object and an interaction module according to an exemplary embodiment of the present disclosure.
Figure 3B:
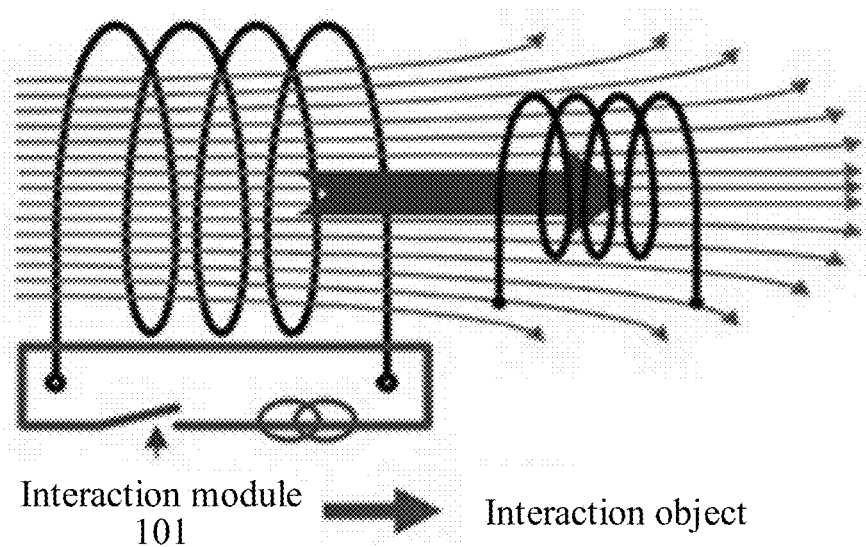
Figure 3C:
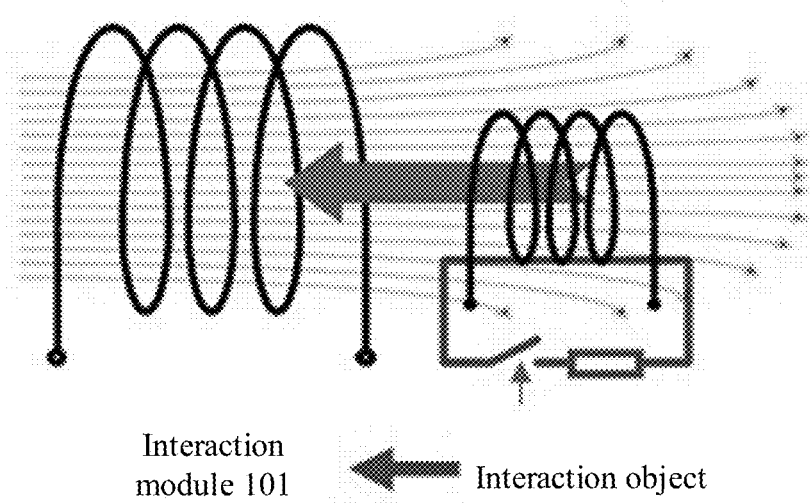

1) When the interaction object is located in a positioning detection region of the positioning module 103, the positioning module 103 generates positioning information of the interaction object and sends the positioning information of the interaction object to the control module 104.
2) The control module 104 determines a target switch unit and a target interaction unit according to the positioning information, and controls the target switch unit to communicate the target interaction unit with the drive module 105.
3) After the target interaction unit is communicated with the drive module 105, the target interaction unit always emits a sine wave signal with a frequency of 13.56 MHz under drive of the drive module 105, as shown in FIG. 3a. When the interaction object is within a range of a communication magnetic field of the target interaction unit, the interaction object acquires energy through coupling and feeds back an interaction signal to the drive module 105 through the target interaction unit.
4) After receiving the interaction signal from the interaction object, the drive module 105 determines that there is an interaction object within the range of the communication magnetic field of the target interaction unit, encodes and modulates a data signal and transmits it through the target interaction unit, as shown in FIG. 3b.
5) The interaction object receives the encoded and modulated data signal transmitted by the target interaction unit through inductive coupling of its own antenna, decrypts and rectifies through its own internal chip to obtain a corresponding command, and encodes and modulates its own data interaction information according to the obtained command and then fed it back to the drive module 105 through the target interaction unit, as shown in FIG. 3c. In an exemplary implementation mode, what kind of data interaction information the interaction object returns to the drive module 105 through the target interaction unit according to the obtained command may be set in advance.

Figure 3D:
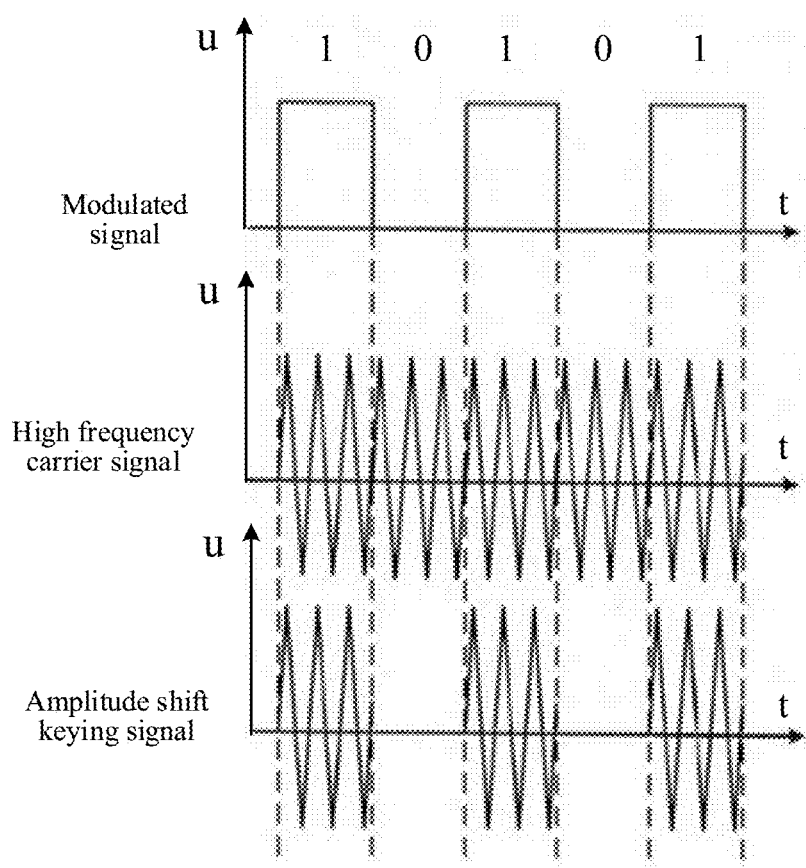
FIG. 3d is a schematic diagram of a Amplitude Shift Keying (ASK) encoding.
Figure 3E:
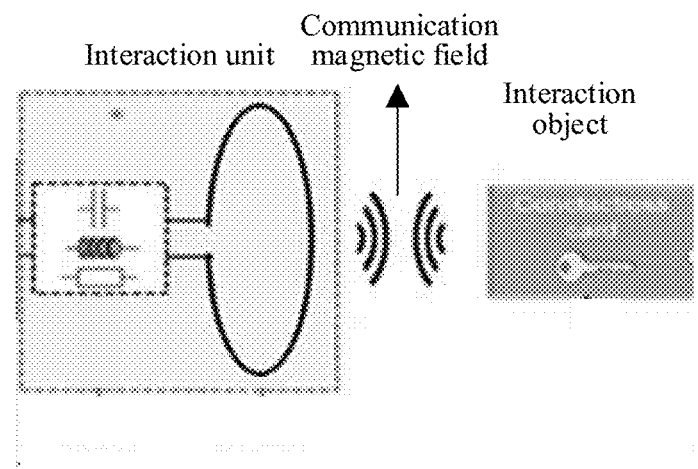
FIG. 3e is a schematic diagram of data interaction between an intersecting object interaction unit and an intersecting object according to an exemplary embodiment of the present disclosure.

As shown in FIG. 3e, it is a schematic diagram of data interaction between the target interaction unit and the interaction object under drive of the drive module 105.

6) The drive module 105 receives and decodes the encoded and modulated data interaction information, and sends the decoded data interaction information to the control module 104, and the control module 104 processes the decoded data interaction information. In an exemplary embodiment, corresponding software may be controlled by the control module 104 to process the decoded data interaction information.

In the exemplary implementation mode, when the drive module 105 drives the interaction module 101 to perform data interaction with the interaction object based on the ISO14443A protocol, as shown in FIG. 3b, an encoding mode adopted by the drive module 105 when sending a data signal to the interaction object through the target interaction unit is 100% ASK. As shown in FIG. 3c, the interaction object transmits data interaction information to the target interaction unit using a load wave modulation mode.

As shown in FIG. 3d, which is a schematic diagram of ASK encoding using an amplitude shift keying method, and the drive chip 1051 loads a modulated signal onto a high frequency carrier wave to obtain an amplitude shift keying signal.

In an exemplary implementation mode, the control module 104 is configured to set a resistance-capacitance matching value of the drive module 105 according to the target interaction unit, so that field strength energy emitted by the interaction unit during data interaction with the interaction object is within a preset range. As shown in FIGS. 1a and 1b, a resistance-capacitance matching value of the drive module 105 is set by the control module 104 according to the target interaction unit. When each interaction unit 1011 is working, field strength energy emitted by each interaction unit 1011 is within a preset range. It is possible to measure whether field strength energy returned by each interaction unit 1011 received by the drive module 105 is within a preset range (for example, the field strength energy fluctuates up and down by no more than 5% of preset field strength energy) by setting field strength energy test point N at the receiving terminal RX, so that field strength energy emitted by multiple interaction units 1011 when working are as much as possible the same. The field strength energy emitted by the multiple interaction units 1011 when working are as consistent as possible, which may ensure that recognized interaction objects may all be stably recognized. In addition, by setting the resistance-capacitance matching value of the drive module 105 by the control module 104, it may be extended to a variety of application scenarios, expanding an application range and improving universality. For example, when field strength energy required for recognizing an interaction object is changed, it is only necessary to set a resistance-capacitance matching value in the drive module 105 through the control module 104, and the entire data interaction apparatus does not need to be replaced.

Figure 3F:
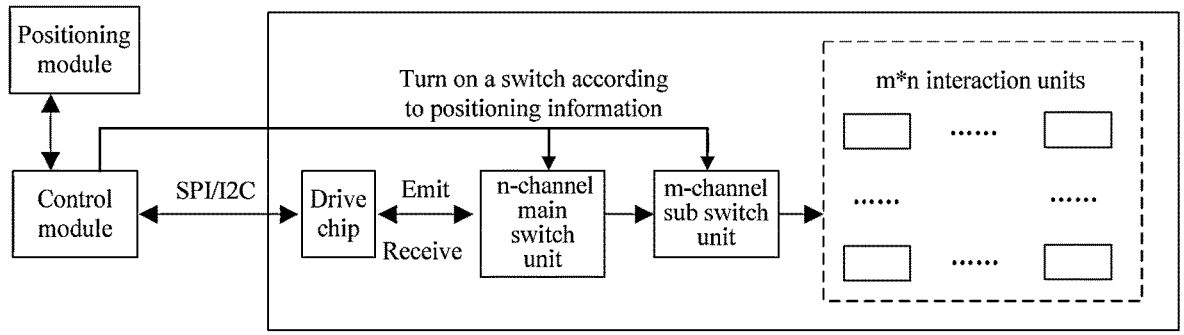
FIG. 3f is a logic block diagram of a data interaction apparatus according to an exemplary embodiment of the present disclosure.

In an exemplary implementation mode, after the control module 104 controls the target switch unit to communicate the target interaction unit with the drive module 105, the control module 104 and the drive module 105 may set the resistance-capacitance matching value of the drive module 105 through a Serial Peripheral Interface (SPI) interface or an Inter-Integrated Circuit (I2C) interface, as shown in FIG. 3f, which is a logic block diagram of a data interaction apparatus 10.

In an exemplary implementation mode, the drive module 105 is provided with a resistance-capacitance value adjustment point, and the control module 104 or the drive module 105 stores a resistance-capacitance value matching table.

The control module 104 is configured to search a target resistance-capacitance value corresponding to the target interaction unit from the resistance-capacitance value matching table, and adjust the resistance-capacitance value adjustment point according to the target resistance-capacitance value to set a resistance-capacitance matching value of the drive module 105.

In an exemplary implementation mode, after determining an applied scenario, field strength energy of each interaction unit 1011 when working may be determined accordingly, and a field strength energy test is performed on each interaction unit 1011 before the data interaction apparatus 10 is officially operated. When testing one interaction unit 1011, when field strength energy received by the receiving terminal of the drive module 105 is not within a preset field strength energy range, a resistance-capacitance matching value in the drive module 105 is adjusted until the field strength energy received by the receiving terminal RX of the drive module 105 is within the preset field strength energy range, and a resistance-capacitance matching value corresponding to the interaction unit 1011 is recorded and saved into the resistance-capacitance value matching table, and so on. After the field strength energy test for each interaction unit 1011 is completed, the resistance-capacitance matching table is saved to the drive module 105 or the control module 104, or the resistance-capacitance matching table may be saved to a place where another control module 104 may find it, which is not limited in the present disclosure.

In an exemplary implementation mode, as shown in FIGS. 2a to 2c, an energy test point N may be set at the receiving terminal RX of the drive chip to test field strength energy at the receiving terminal of the drive chip 1051. As shown in FIGS. 1a and 1b, a field strength energy test point M of an interaction unit may be set between an interaction unit 1011 and the switch module 102 to test field strength energy of the interaction unit 1011.

As shown in FIGS. 1a to 2c, the resistance-capacitance matching value of the drive module 105 is set according to the target interaction unit by the control module 104, and field strength energy measured at a field strength energy test point M of each interaction unit 1011 when the interaction unit 1011 is working is within a preset range (e.g., the field strength energy fluctuates up and down by no more than 5% of preset field strength energy), so that field strength energy sent by multiple interaction units 1011 when working may be as identical as possible, thereby ensuring that interaction objects need to be recognized may all be stably recognized.

In an exemplary implementation mode, a resistance-capacitance matching value of the drive chip 1051 in the drive module 105 is set according to the target interaction unit by the control module 104.

In one feasible implementation mode, setting the resistance-capacitance matching value of the drive chip 1051 by the control module 104 is combined with both the capacitance matching circuit 1053 and the resistance-capacitance circuit 1055 set in the drive module 105, and the capacitance matching circuit 1053 and the resistance-capacitance circuit 1055 may make field strength energy received and emitted by the drive chip more refined on a basis of setting the resistance-capacitance matching value of the drive chip 1051 by the control module 104. For example, after testing the resistance-capacitance value matching table corresponding to each interaction unit 1011 and before the interaction apparatus officially works, if a resistance-capacitance matching value of the drive chip 1051 is set according to the resistance-capacitance matching table, field strength energy emitted by the interaction unit 1011 has a deviation from a preset field strength energy range. In order not to adjust resistance-capacitance values in the resistance-capacitance matching table one by one, the capacitance matching circuit 1053 may be adjusted to enable field strength energy emitted by each interaction unit 1011 to be within a preset range as much as possible. For the capacitance matching circuit 1053 and the resistance-capacitance circuit 1055, a resistance-capacitance value may be adjusted through hardware, and a resistance-capacitance matching value of the drive chip 1051 set by the control module 104 may be a software-adjusted resistance-capacitance value. Under normal circumstances, after an application scenario is fixed, the capacitance matching circuit 1053 and the resistance-capacitance circuit 1055 that have been debugged will not be changed again. When the data interaction apparatus interacts with an interaction object every time, the capacitance matching circuit 1053 and the resistance-capacitance circuit 1055 will not be adjusted, while the control device 104 may set a resistance-capacitance matching value of the drive chip 1051 for each data interaction.

Figure 4A:
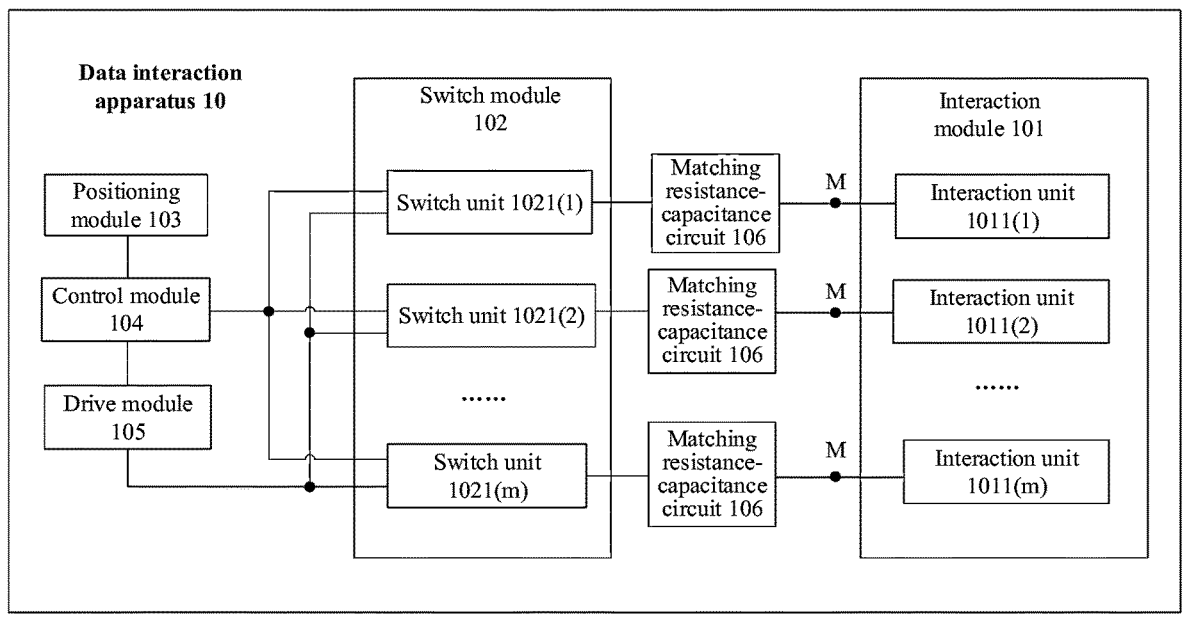
FIGS. 4a and 4b are schematic diagrams of modules of a data interaction apparatus according to an exemplary embodiment of the present disclosure.
Figure 4B:
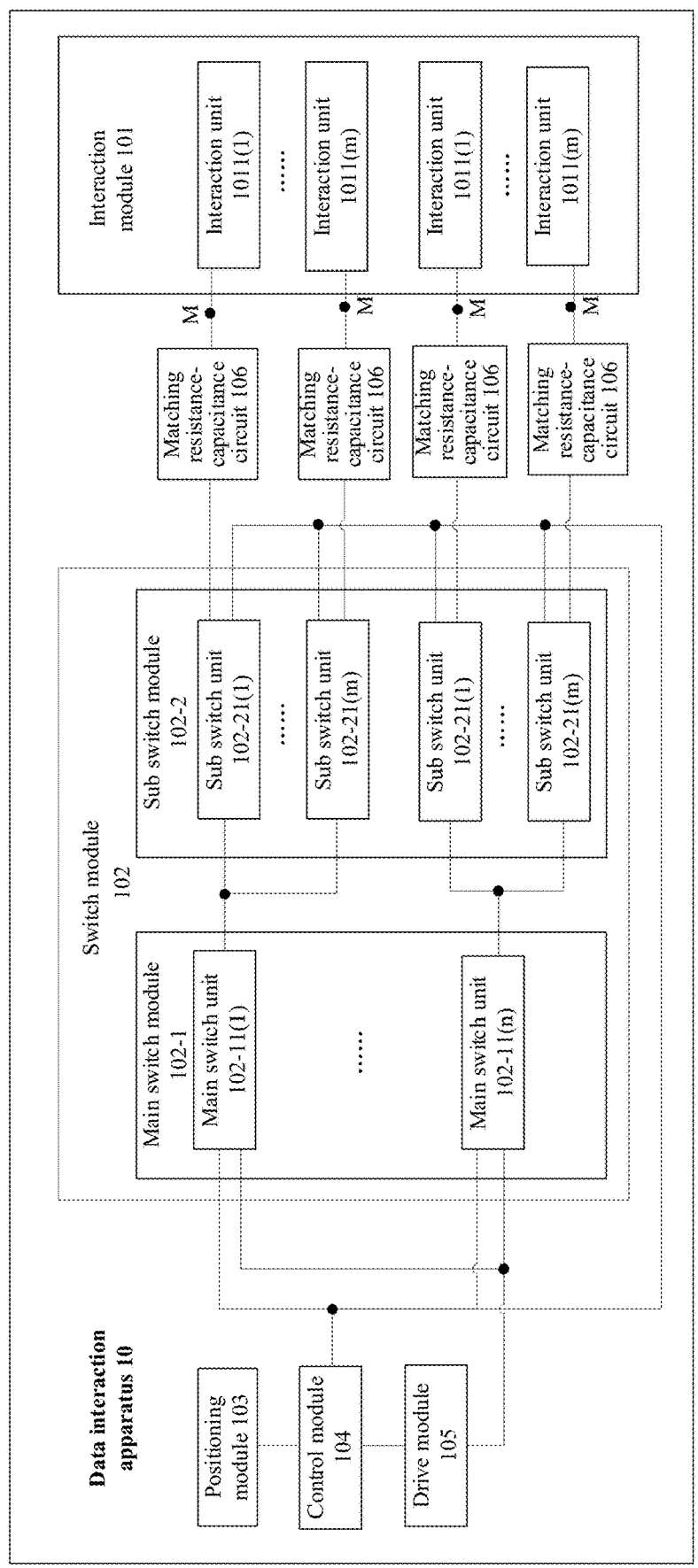

In an exemplary implementation mode, as shown in FIGS. 4a and 4b, each interaction unit 1011 may be provided with a matching resistance-capacitance circuit 106 to adjust field strength energy emitted by each interaction unit 1011 so that the field strength energy emitted by each interaction unit is within a preset range.

In an exemplary implementation mode, as shown in FIGS. 4a and 4b, a matching resistance-capacitance circuit 106 may be provided between each interaction module 101 and the switch module 102.

Figure 4C:
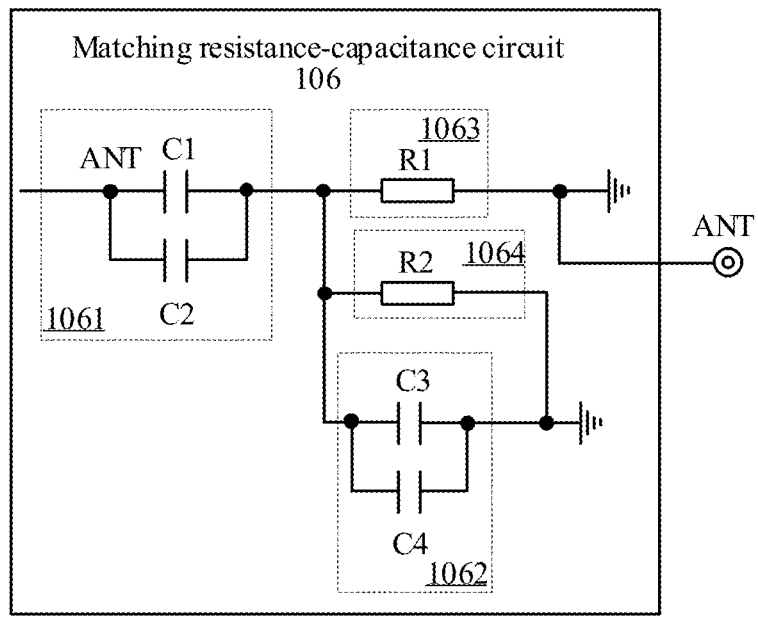
FIG. 4c is a schematic circuit diagram of a matching resistance-capacitance circuit according to an exemplary embodiment of the present disclosure.

In an exemplary implementation mode, as shown in FIG. 4c, each matching resistance-capacitance circuit 106 includes a first parallel capacitor circuit 1061, a second parallel capacitor circuit 1062, a series resistor circuit 1063, and a parallel resistor circuit 1064.

The first parallel capacitor circuit 1061 includes a first capacitor C1 and a second capacitor C2 connected in parallel, one terminal is connected with an antenna ANT in an interaction unit 1011, and the other terminal is connected with the series resistor circuit 1063.

The second parallel capacitor circuit 1062 includes a third capacitor C3 and a fourth capacitor C4 connected in parallel, one terminal is connected with a first resistor R1, and the other terminal is connected with the ground.

The series resistor circuit 1063 includes the first resistor R1, one terminal is connected with the first parallel capacitor circuit 1061, and the other terminal is connected with the ground.

The parallel resistor circuit 1064 includes a second resistor R2 connected in parallel with the second parallel capacitor circuit 1062.

In an exemplary embodiment, the matching resistance-capacitance circuit 106 may be arranged in combination with the capacitance matching circuit 1053 and the resistance-capacitance circuit 1055 so that field strength energy emitted by an interaction unit 1011 is within a preset range. Field strength energy emitted by the drive chip 1051 is more refined on a basis of the matching resistance-capacitance circuit 106. For example, when a range of the field strength energy emitted by the interaction unit 1011 is not refined enough after the matching resistance-capacitance circuit 106 is initially set, the range of the field strength energy emitted by the interaction unit 1011 may be more refined by optimally setting the matching resistance-capacitance circuit 106, thus ensuring that an interaction object is not erroneously recognized or an interaction object cannot be recognized.

In an exemplary implementation mode, an antenna in an interaction unit 1011 is designed, and an inductance of the antenna may be calculated according to formula 1.

$$L_1 = 2 * I_1 * \left( ln\left(\frac{I_1}{D_1}\right) - K \right) * N_1^{1.8} \quad \text{Formula (1)}$$

In formula 1, $I_1$ is a length of a loop of wires for manufacturing the antenna in the interaction unit 1011; $D_1$ is a diameter of a wire for manufacturing the antenna or a width of a wire for manufacturing the antenna on a Printed Circuit Board (PCB); K is a constant, when a structure of the antenna is a square antenna, K=1. 47, when the structure of the antenna is a loop antenna, K=1. 07; $N_1$ is a quantity of coils for manufacturing the antenna; and ln is a natural logarithmic function. An actual value of an antenna inductance $L_1$ is determined by factors such as the structure of the antenna, the diameter or width $D_1$ of the wire for manufacturing the antenna, a distance between coils for manufacturing the antenna, and a shielding layer. When the antenna is manufactured on a PCB board, determinants of the actual value of the antenna inductance $L_1$ may include a type of the PCB board. In an exemplary implementation mode, the actual value of the antenna inductance $L_1$ may be determined with the shielding layer and a nearby metal. In an exemplary implementation mode, a value of the antenna inductance $L_1$ may be adjusted by adjusting one or more of the aforementioned $D_1$, $I_1$, the structure of the antenna, the distance between the coils for manufacturing the antenna, and the shielding layer.

In an exemplary implementation mode, the actual value of the antenna inductance $L_1$ may be calculated from formula 1 or may be obtained by testing with a Vector Network Analyzer (VNA for short). In an exemplary implementation mode, the antenna inductance obtained by testing with the VNA may be taken as the standard, or a final antenna inductance value may be determined by combining an antenna inductance value obtained by testing with an antenna inductance value calculated from formula 1.

Figure 5A:
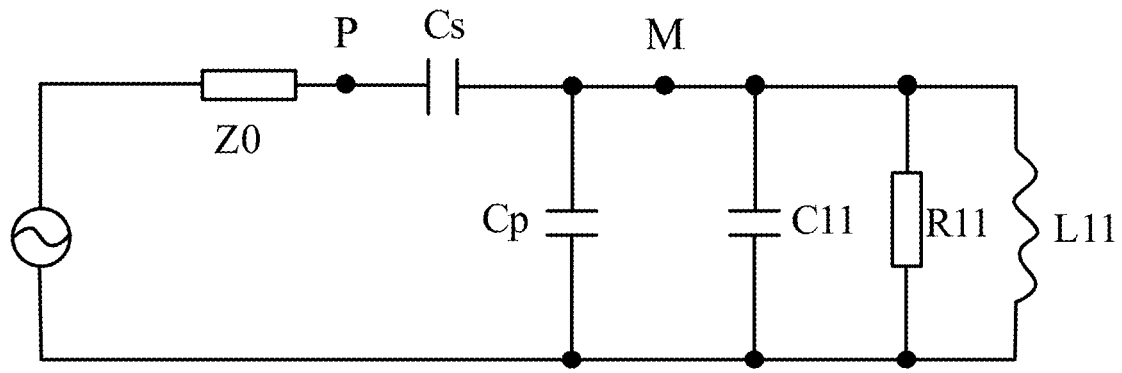
FIGS. 5a and 5b are equivalent circuit diagrams an antenna and a matching resistance-capacitance circuit in an interaction unit according to exemplary embodiments of the present disclosure.

In an exemplary implementation mode, field strength energy emitted by an antenna in an interaction unit 1011 may be adjusted through the matching resistance-capacitance circuit 106 shown in FIG. 4c. As shown in FIG. 5a, which is a logic schematic diagram of a combination of the antenna in the interaction unit 1011 and the matching resistance-capacitance circuit 106. A sine wave emitted by the antenna in the interaction unit 1011 may be represented by U=Um*Sin(2π*f*t), U represents a voltage, Um represents a maximum value of the voltage, t represents time, and f represents a frequency. In an exemplary implementation mode, a value of frequency f may be 13.56 MHz.

In the logic schematic diagram shown in FIGS. 5a, C11, R11, and L11 are an equivalent capacitance, an equivalent resistance, and an equivalent inductance of the antenna in the interaction unit 1011, respectively. Z0 is an impedance before an antenna impedance matching resistance-capacitance point P (i.e., Z0 is an equivalent resistance of the drive module 105 and the switch module 102), and an impedance of the antenna and an overall impedance of the matching resistance-capacitance circuit 106 are Zeq. In order to ensure emitting energy and an efficiency of the antenna, the impedance Z0 and the impedance Zeq are set to be conjugate matched. In an exemplary implementation mode, a value of the impedance Z0 is from 40 ohms to 60 ohms, a value of the impedance Zeq may be from 40 ohms to 60 ohms; for example, the value of impedance Z0 is 50 ohms, and the value of impedance Zeq is 50 ohms.

In an exemplary implementation mode, in the logic schematic diagram shown in FIG. 5a, capacitors Cp and Cs may be adjusted according to formulas 2 and 3.

$$Cp = \frac{2W * Xeq * R\text{ target} \pm \sqrt{4W^2 * Xeq^2 * Req^2 - 4 * Rtarget * (Rtarget - Req)(W^2 * Xeq^2 + W^2 * Req^2)}}{2 * R\text{ target} (W^2 * Xeq^2 + W^2 * Req^2)} \quad \text{Formula (2)}$$

$$Xtarget = \frac{(Xeq - Req^2 * W * Cp - W * Cp * Xeq^2)}{(1 - W * Cp * Xeq)^2 + Req^2 * W^2 * Cp^2} - \frac{1}{W * Cs} \quad \text{Formula (3)}$$

Among them, Zeq=Req+jXeq, Ztarget=Rtarget+jXtarget, j is an unit of an imaginary number, Req and Xeq are a real part and an imaginary part at a working frequency of 13.56 MHz tested by a vector network analyzer, Rtarget and Xtarget are a target real part and a target imaginary part to be debugged actually, W=2*π*f, and a value of a frequency f is set to 13.56 MHz.

Figure 5B:
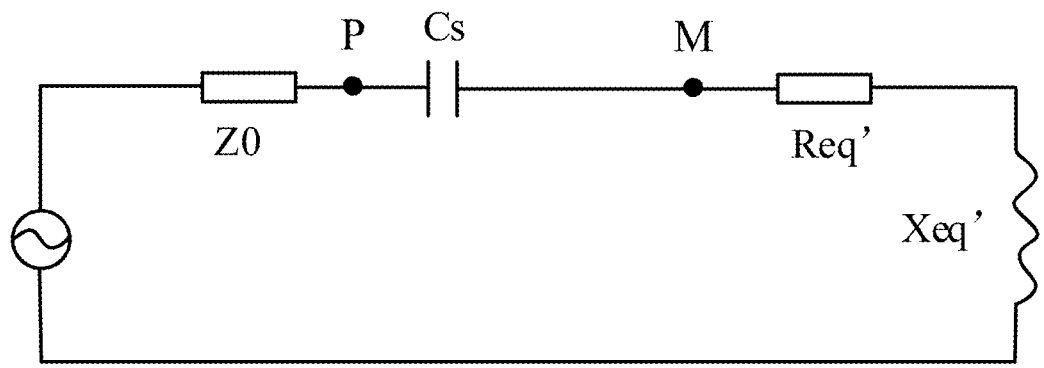

In an exemplary implementation mode, Cp may be the one with a smaller value and after determining Cp and Cs, the logic schematic diagram of FIG. 5a may be equivalent to a schematic circuit diagram of FIG. 5b, and Xeq' may be calculated according to formula 4.

$$Xeq' = \frac{(Xeq - Req^2 * W * Cp - W * Cp * Xeq^2)}{(1 - W * Cp * Xeq)^2 + Req^2 * W^2 * Cp^2}$$ Formula (4)

Xeq' is calculated according to formula 4, and Req'=Rtarget.

Field strength energy (a peak-to-peak value) Vpp of the antenna may be calculated according to formula 5.

$$Vpp = 2 * \frac{Um * \sqrt{(Xeq'^2 + Req'^2)}}{Z0 + Zeq}$$ Formula (5)

In order to ensure that field strength energy Vpp emitted by an antenna in each interaction unit is consistent, a value of the capacitance Cp needs to be adjusted. In order to ensure Xtarget=0, Cs may be adjusted according to formula 3.

Figure 5C:
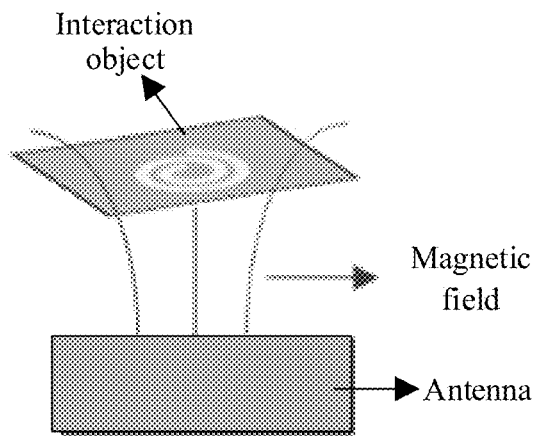
FIGS. 5c and 5d are schematic diagrams of data interaction between an interaction unit and an interaction object.
Figure 5D:
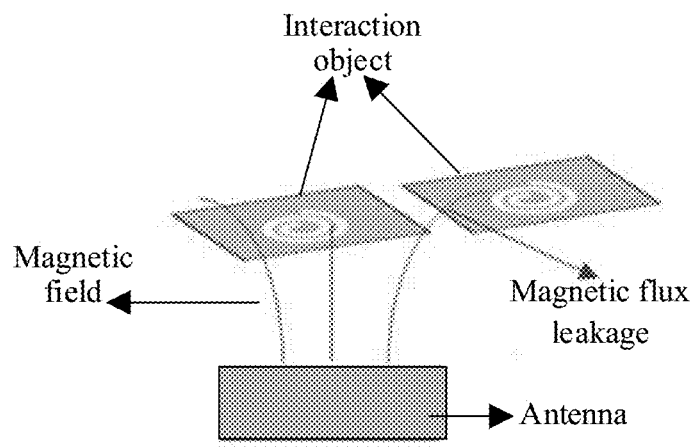
Figure 5E:
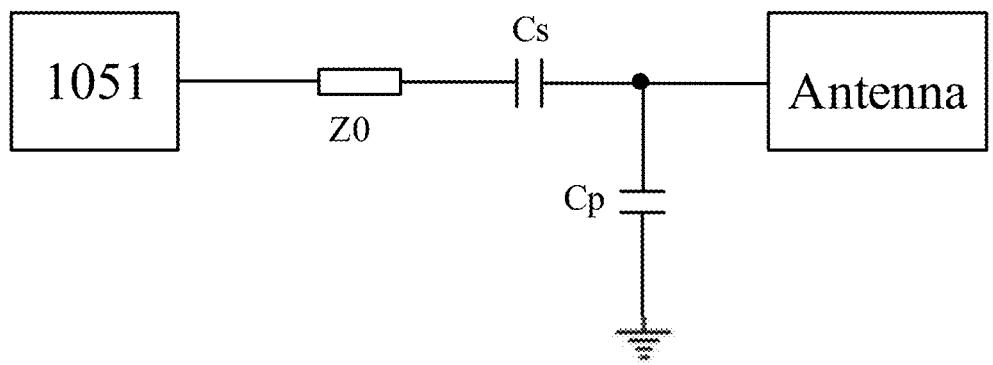
FIG. 5e is a schematic diagram of an equivalent circuit in which a matching resistance-capacitance circuit is connected between a switch module and an antenna coil in an exemplary embodiment of the present disclosure.

In an exemplary implementation mode, for convenience of debugging, the capacitor Cp in FIG. 5a may be debugged using two points of a capacitor C3 and a capacitor C4 in FIG. 4c, the capacitor Cs in FIG. 5a may be debugged using two points of a capacitor C1 and a capacitor C2 in FIG. 4c, and FIG. 5e shows a schematic diagram of an equivalent circuit in which the matching resistance-capacitance circuit 106 is connected between the switch module 102 and an antenna in an interaction unit 1011.

In an exemplary implementation mode, R1 in FIG. 4c is used as a series resistance debugging point and R2 in FIG. 4c is used as a parallel resistance debugging point in order to facilitate adjustment of a quality factor Q value of an antenna. In an exemplary implementation mode, resistance values and a quantity of resistors in the series resistor circuit 1063 and the parallel resistor circuit 1064 may be set according to an actual situation, wherein Z0 is an equivalent resistance of the driving mode 105 and the switch module 102.

In a case where the interaction module 101 has multiple interaction units 1011, as shown in FIGS. 5c and 5d, for an antenna in one interaction unit of the interaction units 1011, if emission energy of the antenna is too small, an interaction object is not easy to be recognized, resulting in an obstacle in data interaction between the interaction object and the interaction unit 1011. As shown in FIG. 5d, if field strength energy of the antenna in the interaction unit 1011 is too large, magnetic flux leakage will occur, resulting in wrong recognition of another interaction object. Finally, the interaction unit 1011 will send interaction information of a wrong interaction object to the control module 104, and the control module 104 will trigger a corresponding operation according to information related to the wrong interaction object. Therefore, in order to enable each interaction unit 1011 to recognize a corresponding interaction object stably and commu-nicate with the interaction object normally, it is necessary to adjust field strength energy of an antenna of each interaction unit 1011 in the interaction module 101 to be consistent.

In an exemplary implementation mode of the present disclosure, a method in which, field strength emission energy of the antenna in the interaction unit 1011 is adjusted through the matching resistance-capacitance circuit 106 in FIGS. 4a and 4b is adopted, or a resistance-capacitance matching value of the drive chip 1051 is set according to a stored resistance-capacitance value of a corresponding interaction unit 1011 through the control apparatus 104 during each data interaction, these two methods may not only ensure that the field strength emission energy of the antenna in the interaction unit 1011 is consistent, stable recognition of an interaction object and normal data interaction with the interaction object is achieved. And when an application scenario is changed, the interaction apparatus does not need to be replaced, and only the matching resistance-capacitance circuit 106 or only a resistance-capacitance matching value of the drive module 105 may be adjusted, thus avoiding waste of interaction apparatuses.

In a solution of setting a resistance-capacitance value of the drive module 105 through the control module 104, when an application scenario is changed, there is no need to adjust a hardware product of the interaction apparatus, and only software may be adjusted to adapt to different application scenarios.

Figure 6A:
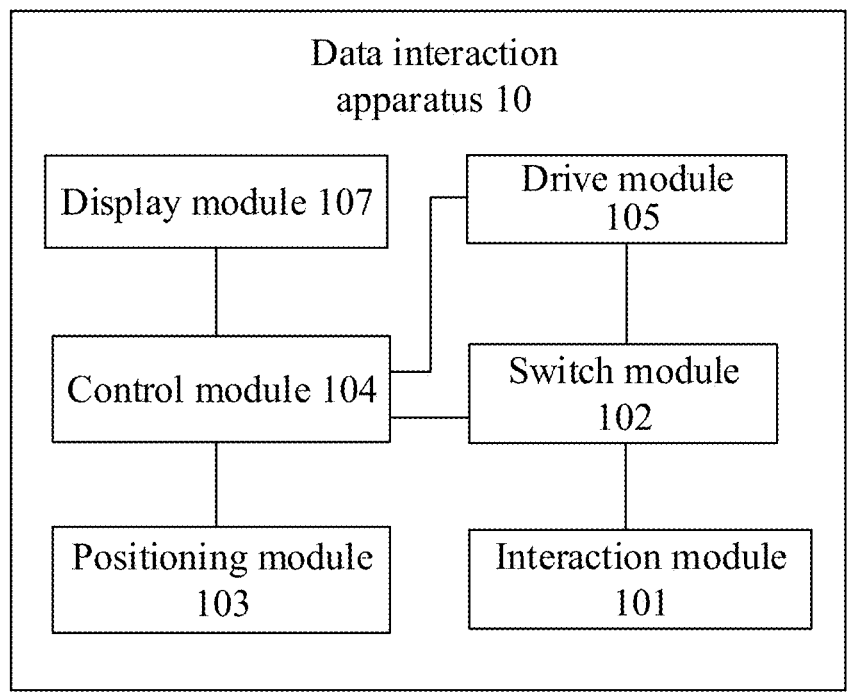
FIG. 6a is a block diagram of modules of a data interaction apparatus according to an exemplary embodiment of the present disclosure.

In an exemplary implementation mode, as shown in FIG. 6a, the data interaction apparatus 10 may include a display module 107.

The control module 104 may be connected with the display module 107 and is configured to control the display module 107 to display according to data interaction information.

The display module 107 is connected with the control module 104 and is configured to display under control of the control module 104.

For example, the control module 104 may call a corresponding audio-visual file according to data interaction information and control the display module 107 to display. Or, the control module 104 may perform corresponding calculation based on data interaction information to obtain a corresponding calculation result, store the calculation result, and display the calculation result through the display module 107.

Figure 6B:
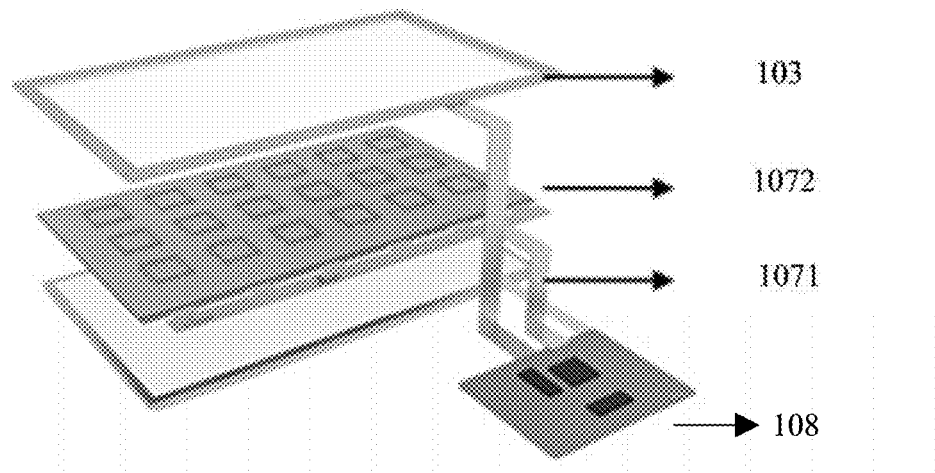
FIGS. 6b and 6c are schematic structural diagrams of an interaction apparatus according to an exemplary embodiment of the present disclosure.

In an exemplary implementation mode, the data interaction apparatus 10 may include a general control board 108. The control module 104 and the drive module 105 may be disposed on the general control board 108. In some exemplary implementation modes, the display module 107, a control chip of a backlight of the display module 107, and a control chip of the positioning module 103 may be disposed on the general control board. Control chips of all modules in the data interaction apparatus 10 are integrated on the general control board, so that maintenance and management of control chips of multiple modules may be facilitated. As shown in FIG. 6b, which is a schematic structure diagram of an interaction apparatus 10, 1071 is a backlight of a display module 107, 1072 is a display panel of the display module 107, and 108 is a general control board. In a structure shown in FIG. 6b, the display panel 1072 may be integrated with an interaction module 101.

Figure 6C:
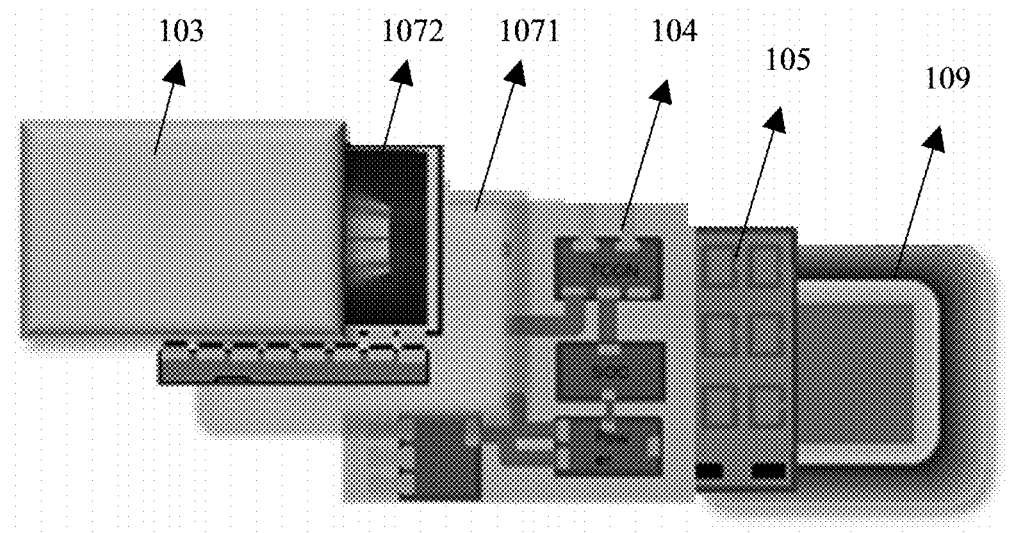

In an exemplary implementation mode, the data interaction apparatus 10 may include a protective housing 109. In an exemplary implementation mode, as shown in FIG. 6c, a drive module 105, a control module 104, a backlight 1071 of a display module 107, a display panel 1072 in the display module 107, and a positioning module 103 are arranged sequentially on one side of the protection housing 109 in a structure of the data interaction apparatus 10, wherein the display panel 1072 or the drive module 105 may be integrated with an interaction unit 1011 in an interaction module 101.

In an exemplary implementation mode, the interaction module 101 is configured as multiple film layers, and each interaction unit 1011 includes an antenna coil; in the interaction module 101, antenna coils of two adjacent interaction units 1011 are located in different film layers, and there is an overlapping region in orthographic projections of regions enclosed by the antenna coils of the two adjacent interaction units 1011 on a plane where one of the film layers is located.

In an exemplary implementation mode, a rectangular winding manner is adopted for the antenna coil in the interaction unit 1011. In an exemplary implementation mode, in order to facilitate modulation of the antenna coil in the interaction unit 1011, a square winding manner is adopted for the antenna coil. In some exemplary implementation modes, a winding manner of another shape may be adopted for the antenna coils in the interaction unit 1011, such as a winding method of a circular structure, which is not limited in the present disclosure.

Figure 7A:
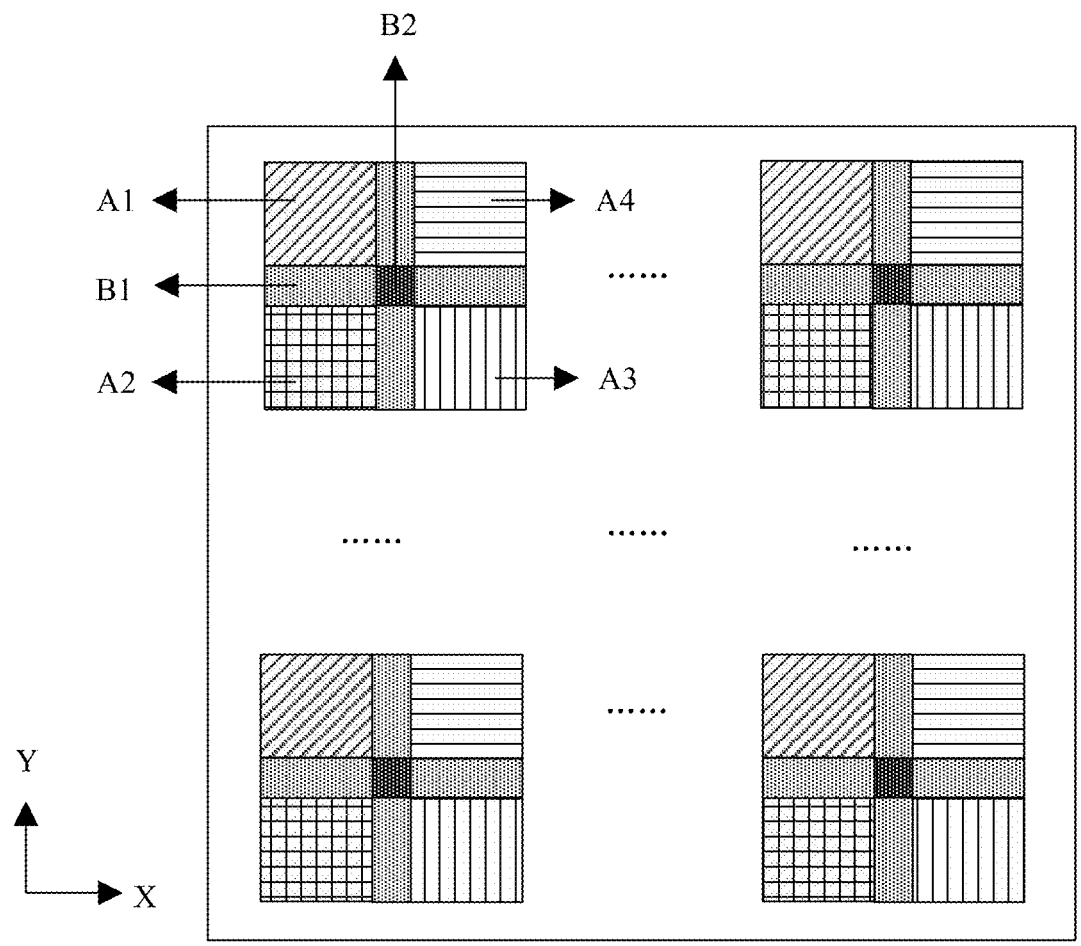
FIGS. 7a to 7u are schematic diagrams of an arrangement of multiple interaction units in an exemplary embodiment of the present disclosure.

In an exemplary implementation mode, the interaction module 101 is configured as four film layers, as shown in FIG. 7*a*, antenna coils in four adjacent interaction units 1011 are respectively arranged on the four film layers, there is a first overlapping region B1 in orthographic projections of regions enclosed by antenna coils of two adjacent interaction units 1011 on a plane where one of the film layers is located, and there is a second overlapping region B2 in orthographic projections of regions enclosed by antenna coils of four adjacent interaction 1011 units on a plane where one of the film layers is located.

In an exemplary implementation mode, there are a first overlapping region B1 and a second overlapping region B2 in orthographic projections of adjacent interaction units 1011 on a plane where one of the film layers is located, so that the interaction apparatus 10 may recognize an interaction object in all regions interacting with the interaction object and each region is covered by an antenna coil. In an exemplary implementation mode, in a structure in which the interaction apparatus includes the display module 107, a display region of the display module 107 is set to a position corresponding to multiple antenna coils in the interaction module 101, and there are a first overlapping region B1 and a second overlapping region B2 in orthographic projections of antenna coils in adjacent interaction units 1011 on a film layer, so that every place in the display region may be covered by a coil.

In an exemplary implementation mode, antenna coils on each film layer in the interaction module 101 are arranged at intervals to avoid interference between antenna coils of a same layer during operation.

In an exemplary implementation mode, a length of a second overlapping region along a first direction X does not exceed ⅙ of a length of a side length of a single coil along the first direction, and a length of the second overlapping region along a second direction Y does not exceed ⅙ of a length of a side length of a single coil along the second direction Y. A length of a first overlapping region B1 formed by antenna coils arranged along the second direction Y along the second direction Y does not exceed ⅙ of a length of a side length of a single antenna coil along the second direction Y, and a length of a first overlapping region B1 formed by antenna coils arranged along the first direction X along the first direction X does not exceed ⅙ of a length of a side length of a single antenna coil along the first direction X.

As shown in FIG. 7*a*, in the interaction module 101, four adjacent coils are respectively a first coil ANT1, a second coil ANT2, a third coil ANT3, and a fourth coils ANT4. A1, A2, A3, and A4 are regions where orthographic projections of the four adjacent coils ANT1, ANT2, ANT3, and ANT4 on a plane where one of the film layers is located are not overlapped with each other.

Figure 7B:
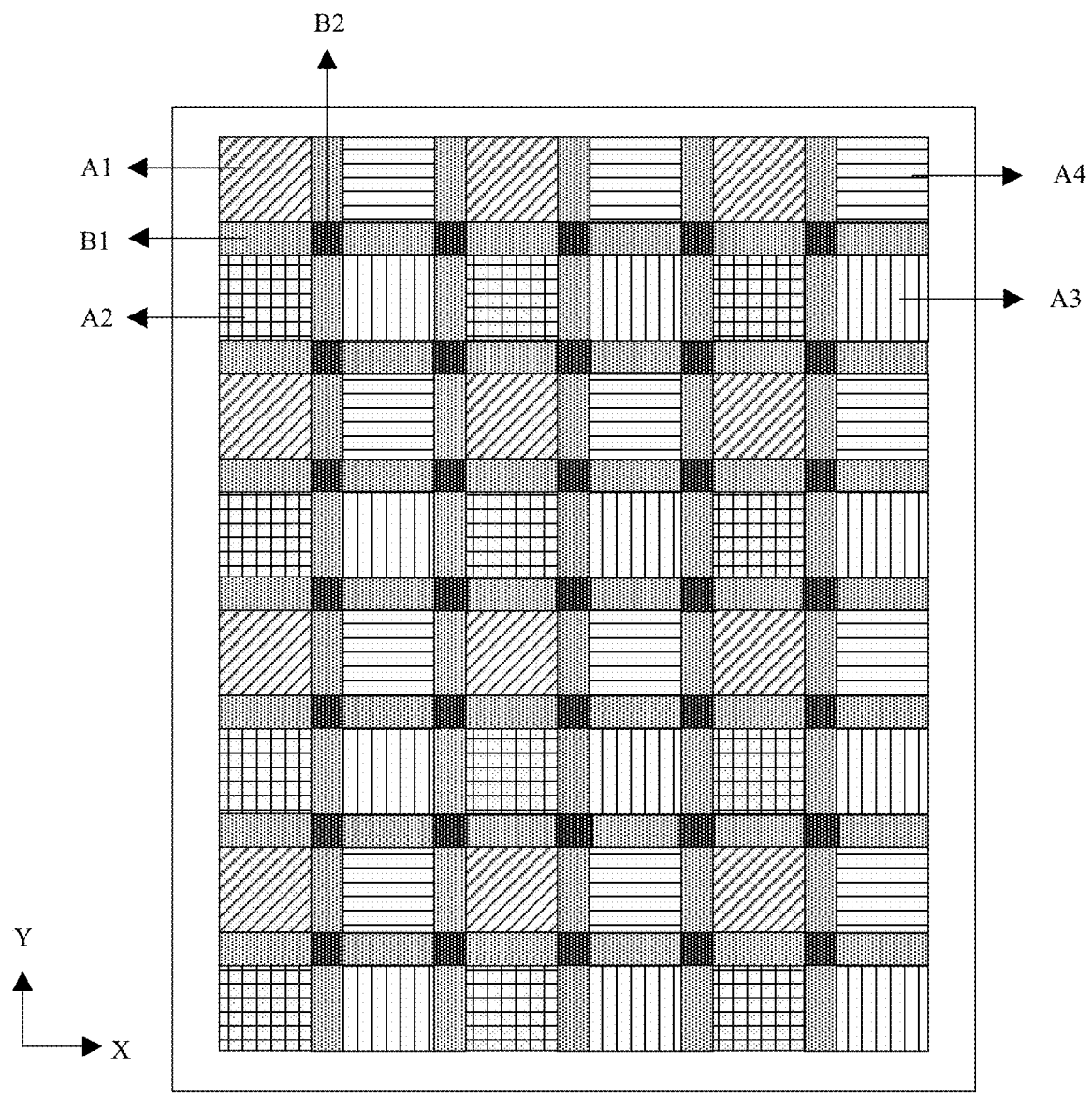
Figure 7C:
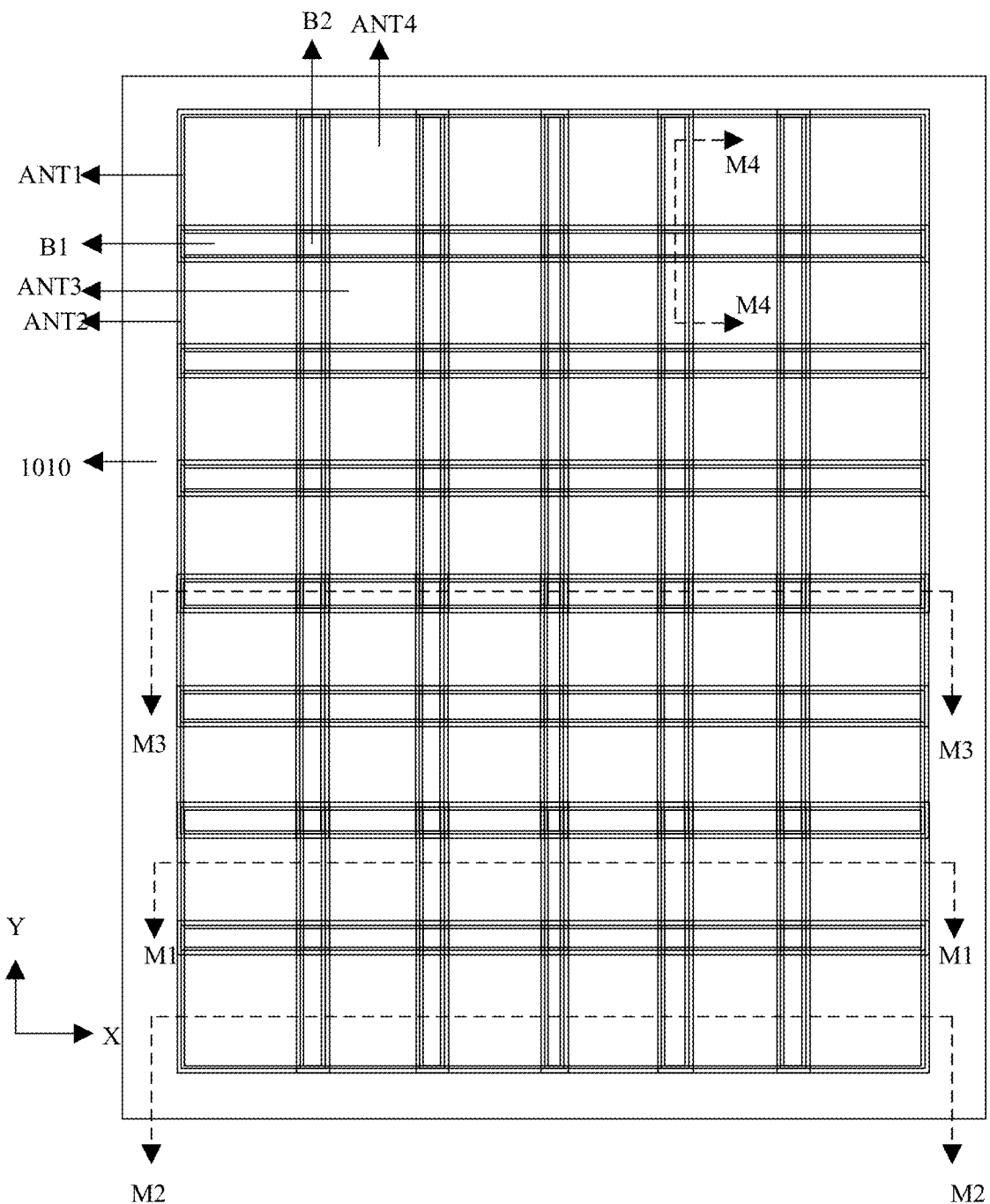
Figure 7D:
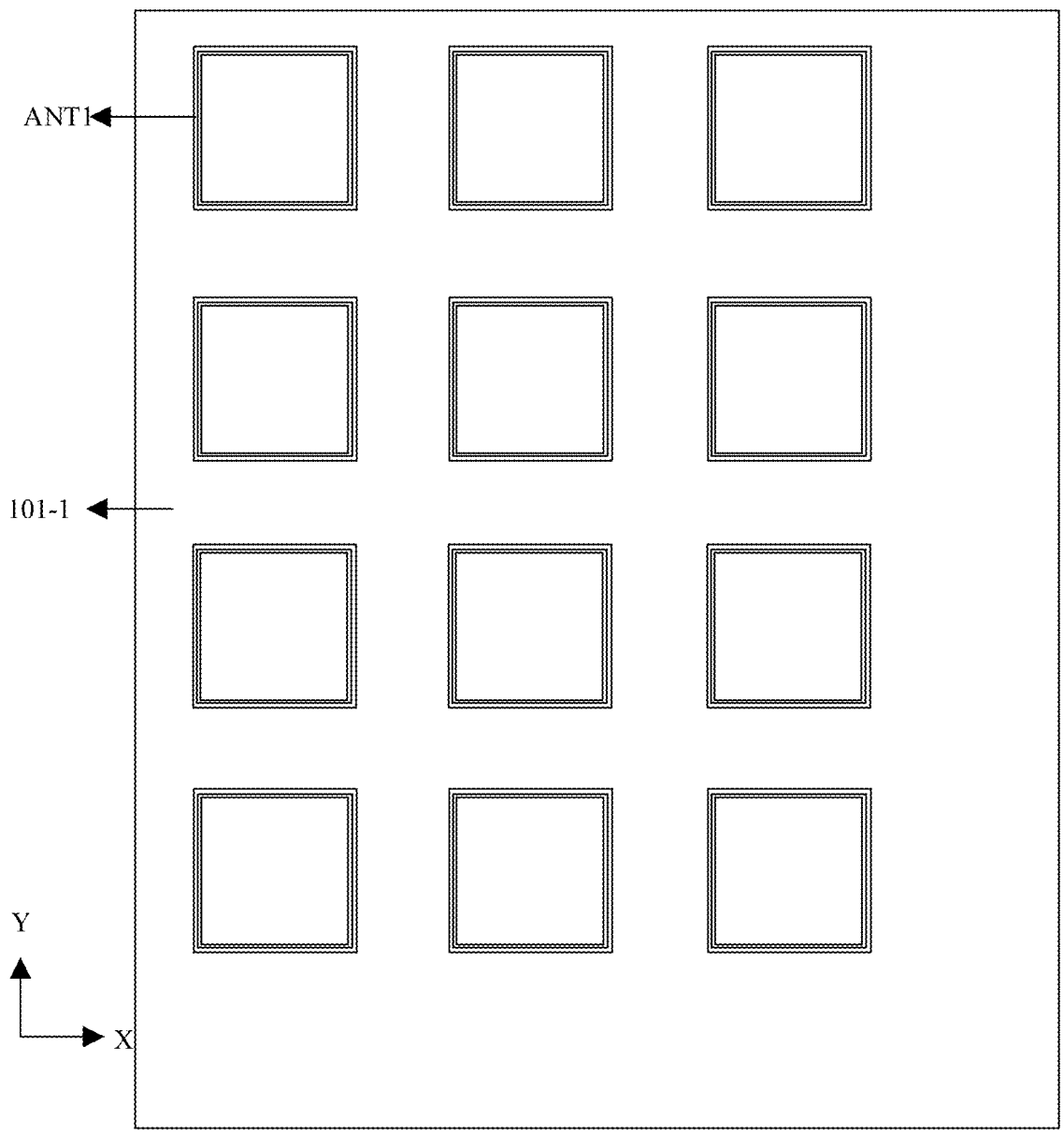
Figure 7E:
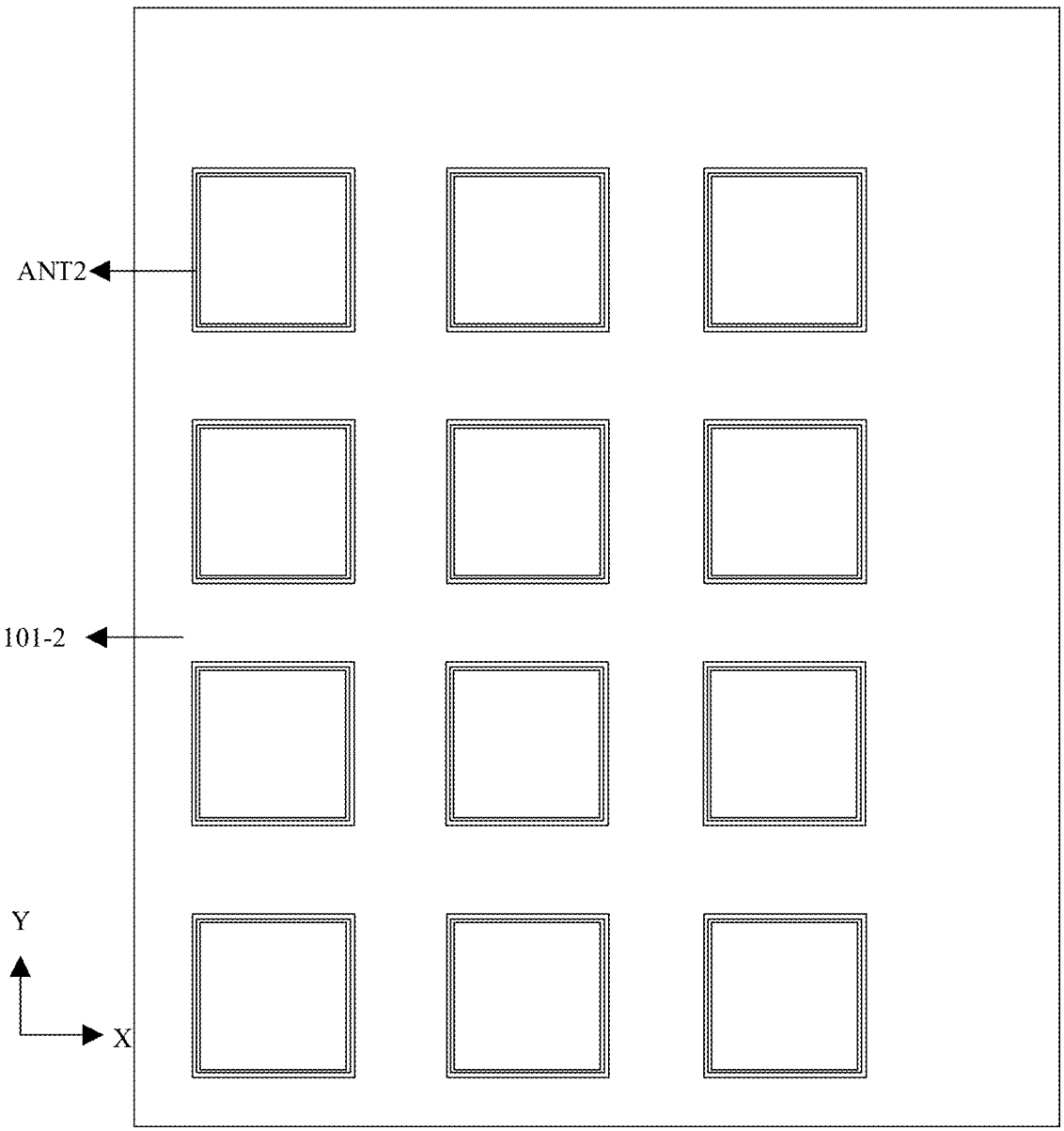
Figure 7F:
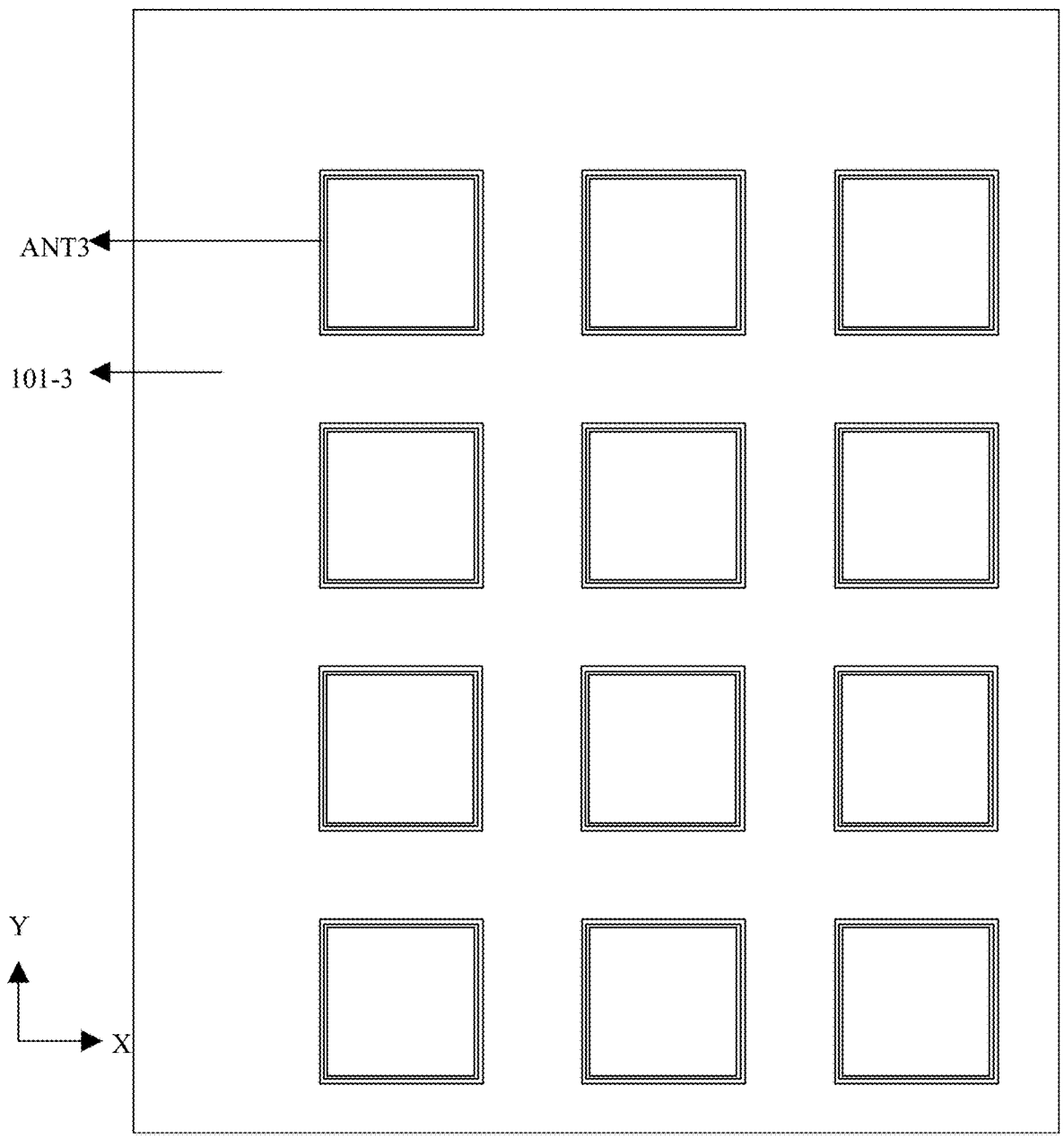
Figure 7G:
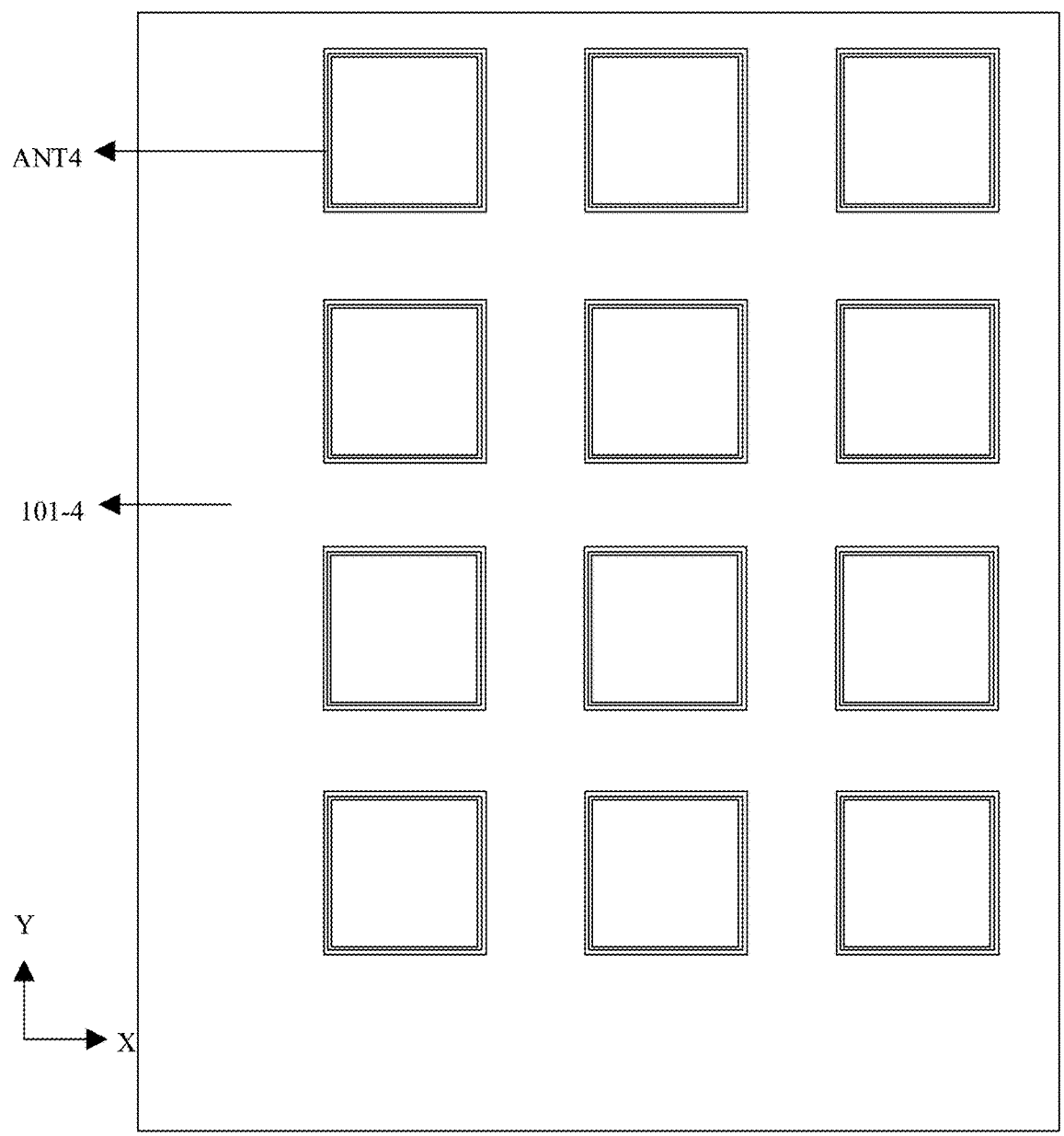
Figure 7H:
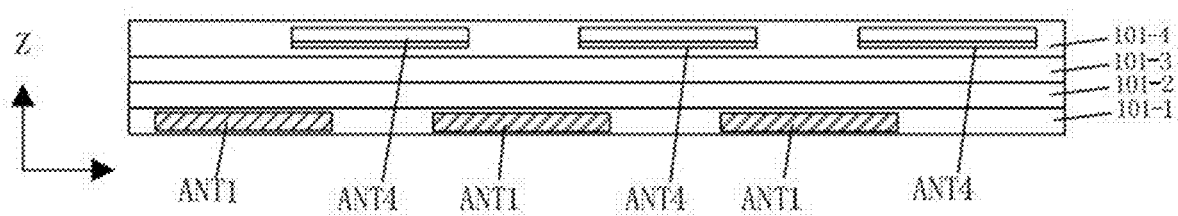
Figure 7I:
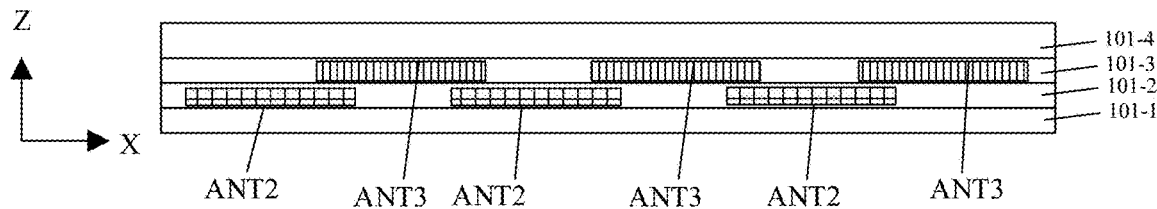
Figure 7J:
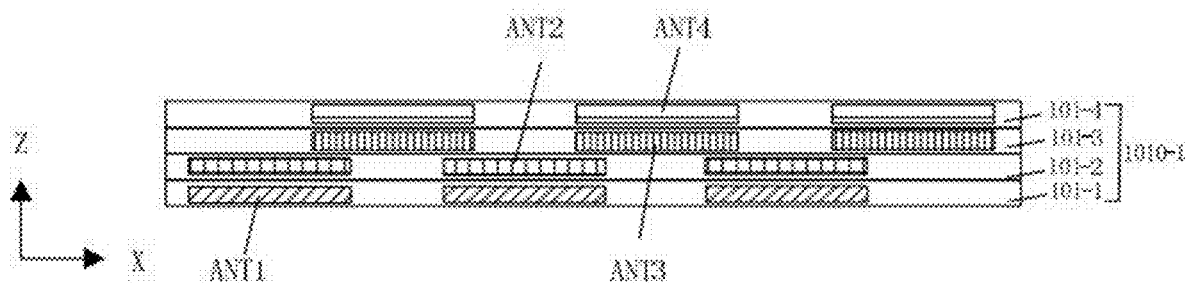
Figure 7K:
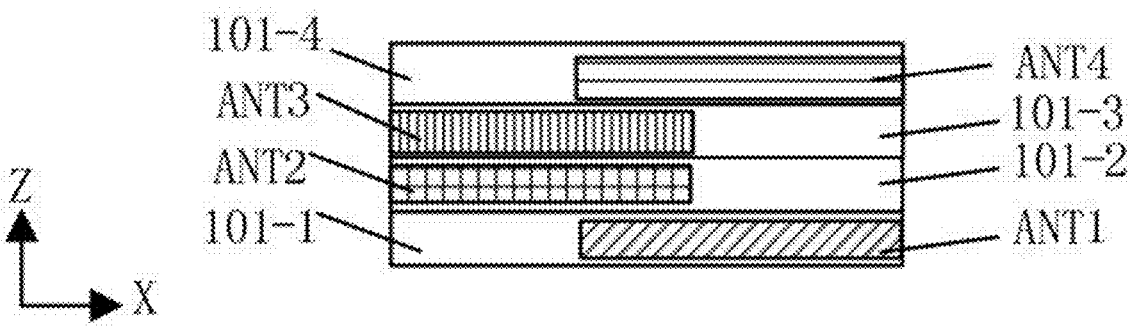

In an exemplary implementation mode, as shown in FIGS. 7*c* to 7*f*, four film layers respectively include a first film layer 101-1, a second film layer 101-2, a third film layer 101-3, and a fourth film layer 101-4 which are stacked. Multiple first coils ANT1 are arranged on the first film layer 101-1 at intervals in an array manner along a first direction X and a second direction Y; multiple second coils ANT2 are arranged on the second film layer 101-2 at intervals in an array manner along the first direction X and the second direction Y; multiple third coils ANT3 are arranged on the third film layer 101-3 at intervals in an array manner along the first direction X and the second direction Y; and multiple fourth coils ANT4 are arranged on the fourth film layer 101-4 at intervals in an array manner along the first direction X and the second direction Y. The first film layer 101-1, the second film layer 101-2, the third film layer 101-3, and the fourth film layer 101-4 are stacked to form four film layers 1010-1. FIG. 7*h* is a cross-sectional view along M1-M1 in FIG. 7*c*, FIG. 7*i* is a cross-sectional view along M2-M2 in FIG. 7*c*, FIG. 7*j* is a cross-sectional view along M3-M3 in FIG. 7*c*, and FIG. 7*k* is a cross-sectional view along M4-M4 in FIG. 7*c*.

In an exemplary implementation mode, multiple antenna coils may be manufactured on one film layer and an insulation layer may be provided between the multiple antenna coils in order to avoid interference between adjacent antenna coils.

The following description is made by taking a case in which the interaction module 101 is configured as four film layers, the interaction module 101 includes 48 interaction units 1011, and 48 antenna coils corresponding to the 48 interaction units 1011 are arranged in a 6*8 array, as an example. As shown in FIG. 7*b*, it is a schematic diagram of a planar structure of a region of the 6*8 antenna coil array in the interaction module 101. FIG. 7*c* shows a schematic diagram of a planar structure of the 6*8 antenna coil array in the interaction module 101. FIG. 7*d* shows a schematic diagram of an array arrangement of the first coils ANT1 on the first film layer 101-1 along the first direction X and the second direction Y. FIG. 7*e* shows a schematic diagram of an array arrangement of the second coils ANT2 on the second film layer 101-2 along the first direction X and the second direction Y. FIG. 7*f* shows a schematic diagram of an array arrangement of the third coils ANT3 on the third film layer 101-3 along the first direction X and the second direction Y. FIG. 7*g* shows a schematic diagram of an array arrangement of the fourth coils ANT4 on the fourth film layer 101-4 along the first direction X and the second direction Y. Wherein, a schematic diagram of a planar structure of four individual film layers in FIGS. 7*d* to 7*g* after stacking is shown in FIG. 7*c*.

In an exemplary implementation mode, the interaction module 101 is configured as a single film layer 1010-2, and each interaction unit 1011 includes an antenna coil.

Antenna coils of two adjacent interaction units 1011 are stacked, an insulation layer is provided between stacked layers where the antenna coils of the two adjacent interaction units are located, and there is an overlapping region in orthographic projections of regions enclosed by the antenna coils of the two adjacent interaction units on a plane where one of the stacked layers is located.

Figure 7L:
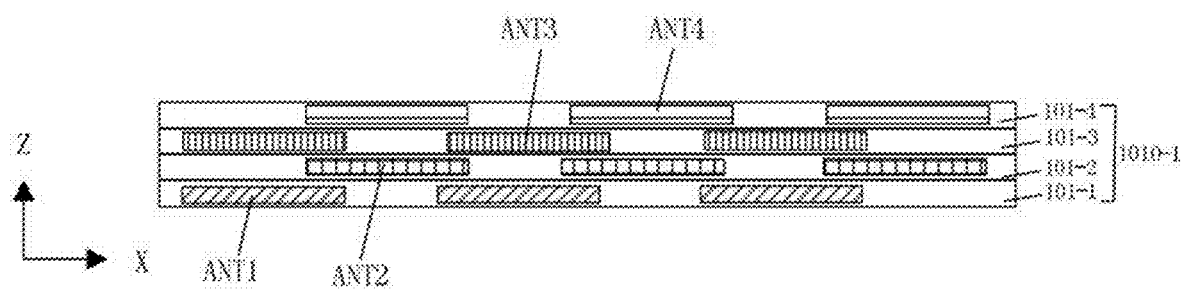
Figure 7M:
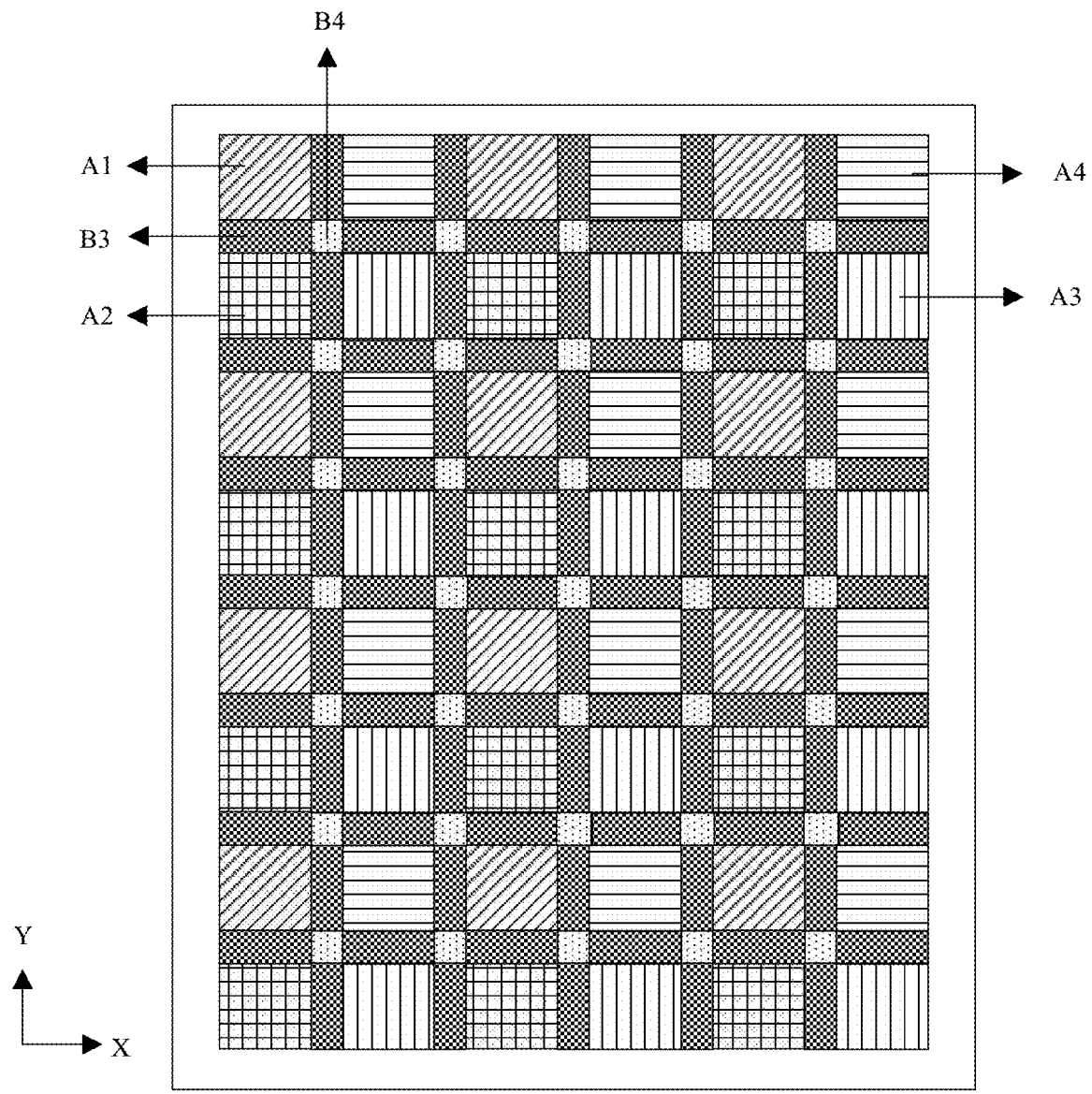

In an exemplary implementation mode, as shown in FIG. 7m, in a structure in which the interaction module 101 is configured as a single film layer 1010-2, antenna coils of multiple interaction units 1011 are configured as four stacked layers, antenna coils in four adjacent interaction units are respectively arranged on the four stacked layers, there is a third overlapping region B3 in orthographic projections of regions enclosed by antenna coils of two adjacent interaction units on a plane where one of the stacked layers is located, and there is a fourth overlapping region B4 in orthographic projections of regions enclosed by antenna coils of the four adjacent interaction units on a plane where one of the stacked layers is located.

In an exemplary implementation mode, a rectangular winding manner is adopted for an antenna coil in the interaction unit 1011. a length of the fourth overlapping region B4 along the first direction X does not exceed ⅙ of a length of a side length of a single antenna coil along the first direction, and a length of the fourth overlapping region B4 along the second direction Y does not exceed ⅙ of a length of a side length of a single antenna coil along the second direction. A length of the third overlapping region B3 formed by antenna coils arranged along the second direction Y along the second direction Y does not exceed ⅙ of a length of a side length of a single antenna coil along the second direction Y, and a length of the third overlapping region B3 formed by antenna coils arranged along the first direction X along the first direction X does not exceed ⅙ of a length of a side length of a single antenna coil along the first direction X.

In an exemplary implementation mode, as shown in FIGS. 7m to 7s, four stacked layers include a first stacked layer 10101, a second stacked layer 10102, a third stacked layer 10103, and a fourth film layer 10104 that are stacked, and antenna coils in four adjacent interaction units are respectively a first coil ANT1, a second coil ANT2, a third coil ANT3, and a fourth coil ANT4. Multiple first coils ANT1 are arranged on the first stacked layer 10101 at intervals along the first direction X and the second direction Y in an array manner; multiple second coils ANT2 are arranged on the second stacked layer 10102 at intervals along the first direction X and the second direction Y in an array manner; multiple third coils ANT3 are arranged on the third stacked layer 10103 at intervals along the first direction X and the second direction Y in an array manner; and multiple fourth coils ANT4 are arranged on the fourth stacked layer 10104 at intervals along the first direction X and the second direction Y in an array manner; wherein, a first insulation layer 1010-1 is provided between the first stacked layer 10101 and the second stacked layer 10102, a second insulation layer 1010-2 is provided between the second stacked layer 10102 and the third stacked layer 10103, and a third insulation layer 1010-3 is provided between the third stacked layer 10103 and the fourth stacked layer 10104.

Figure 7N:
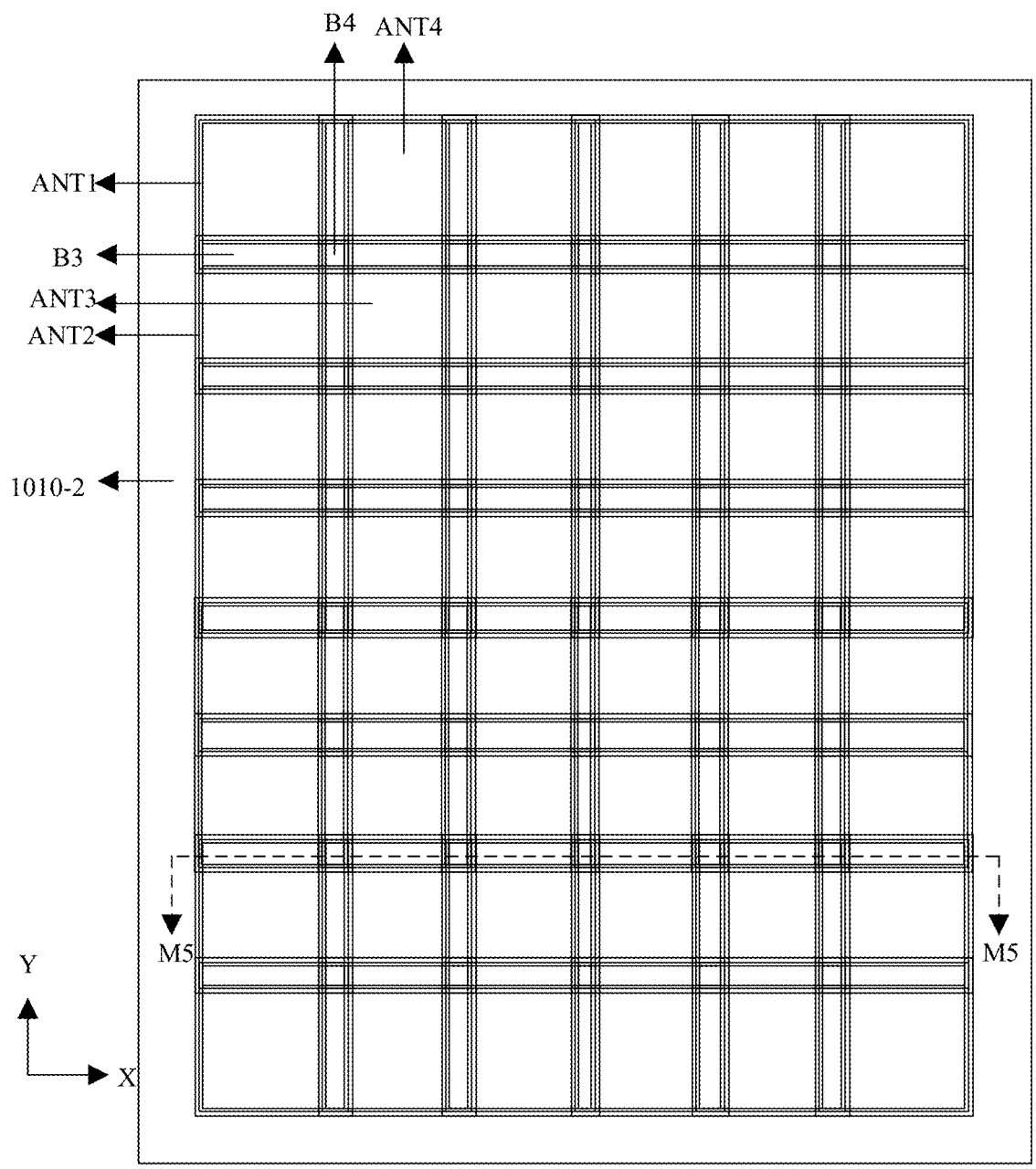
Figure 7O:
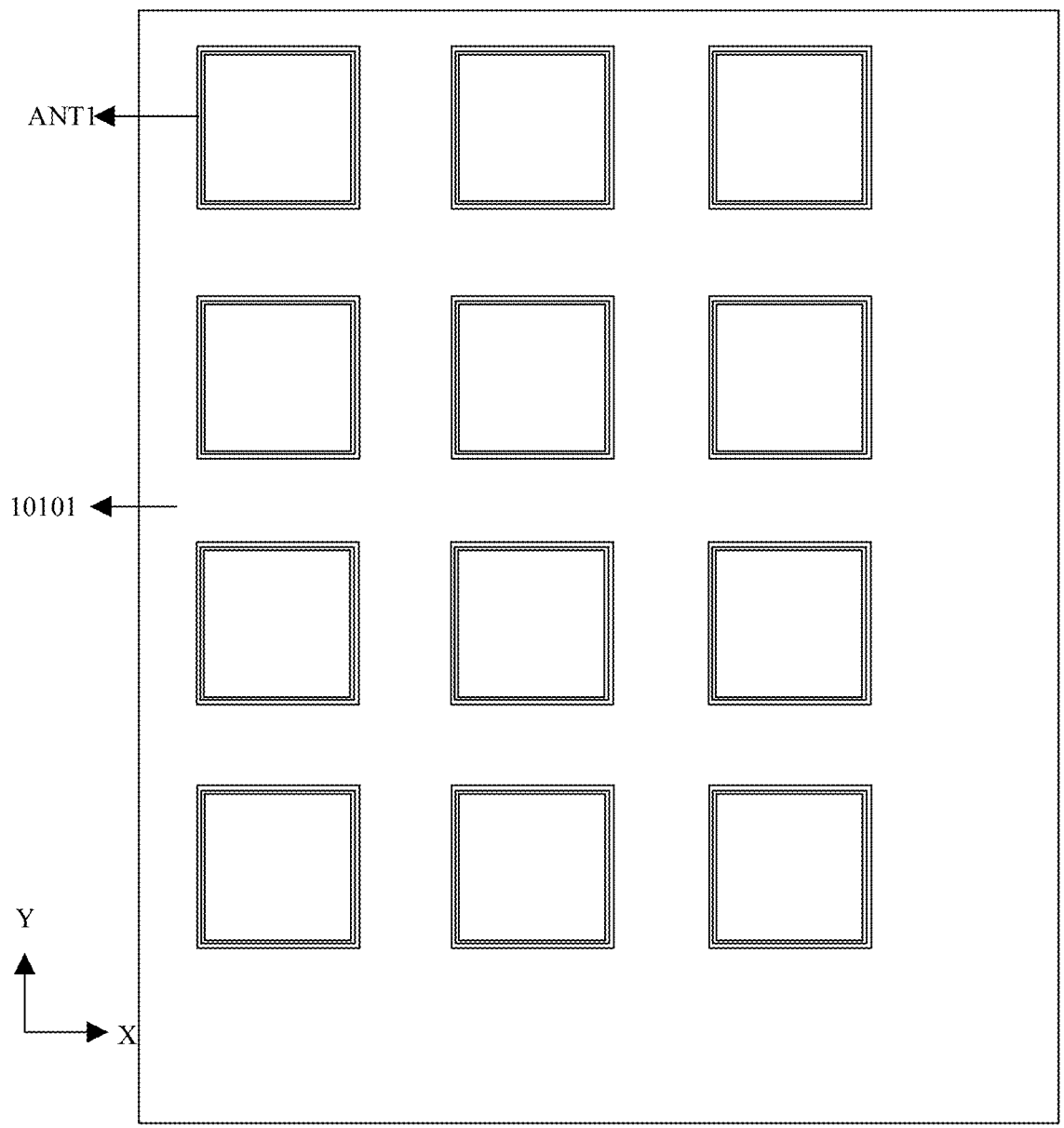
Figure 7P:
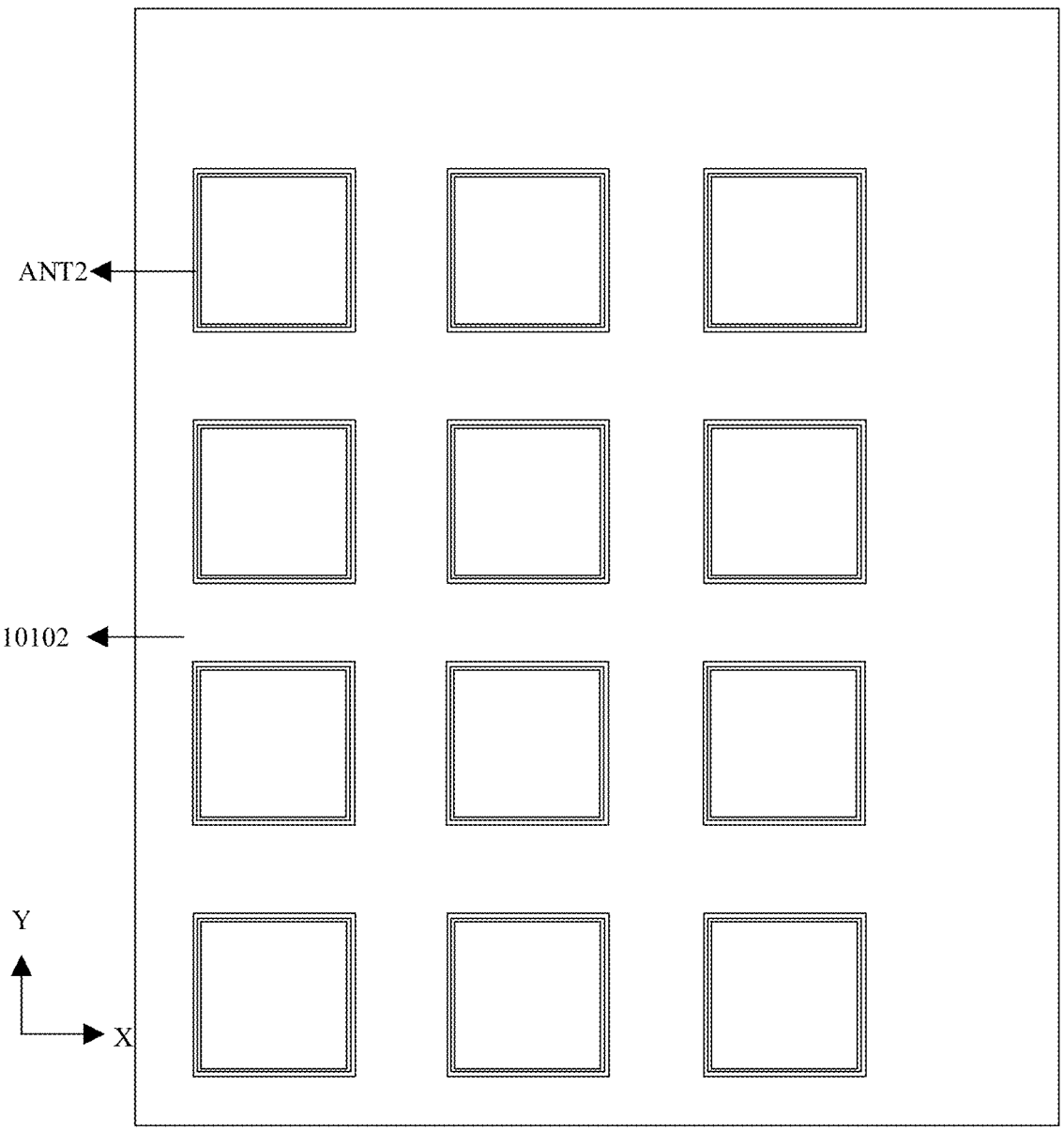
Figure 7Q:
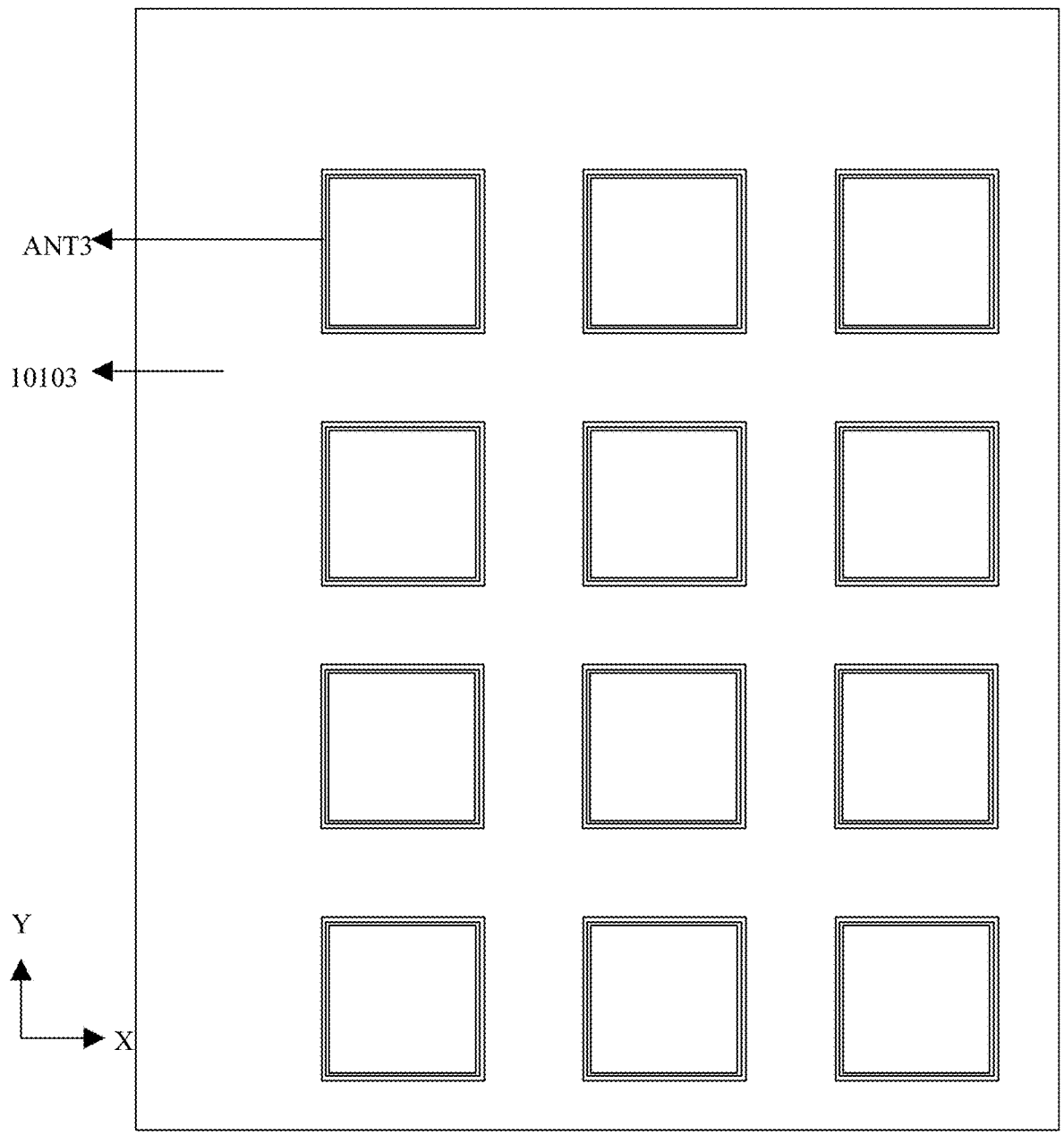
Figure 7R:
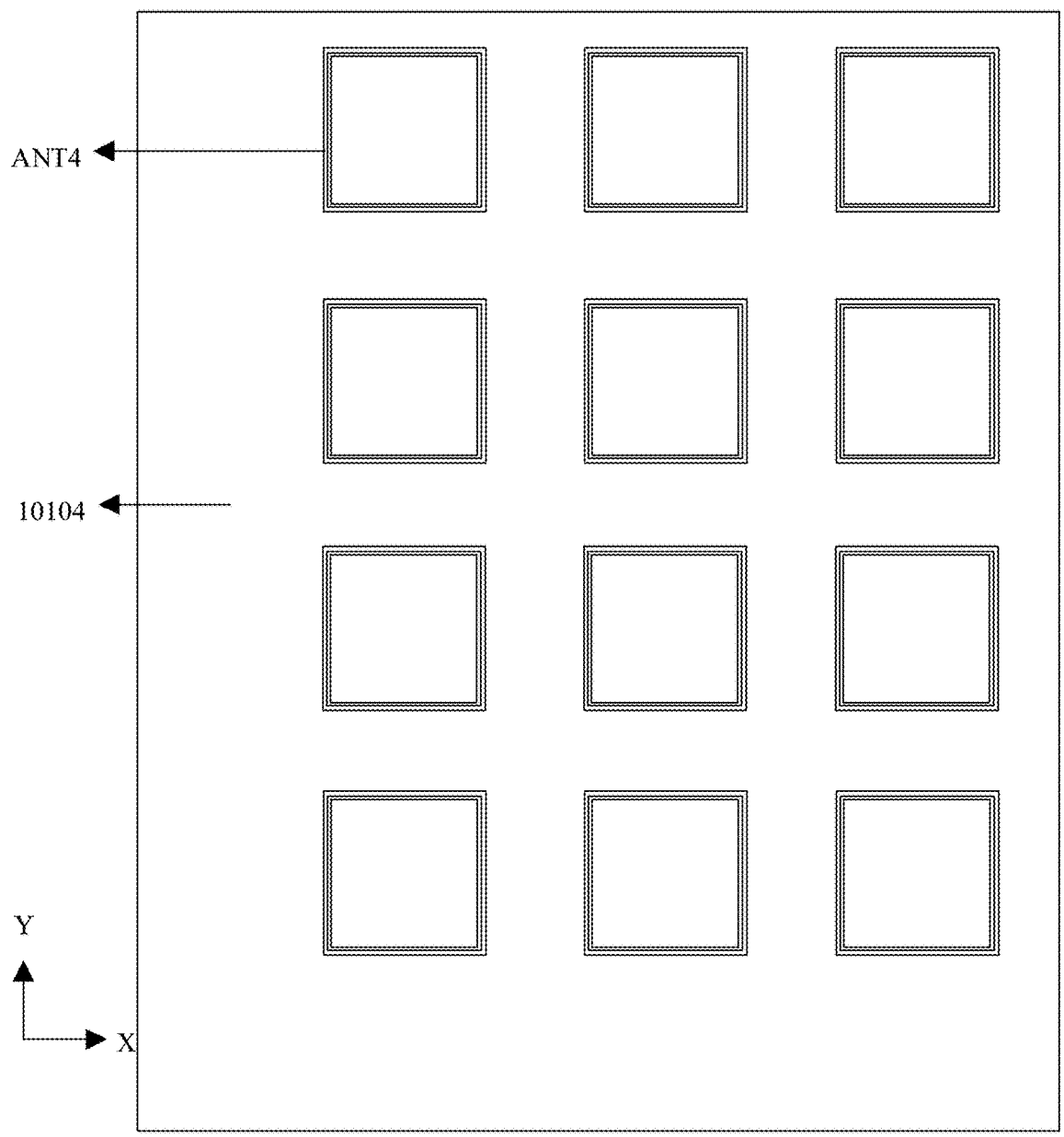
Figure 7S:
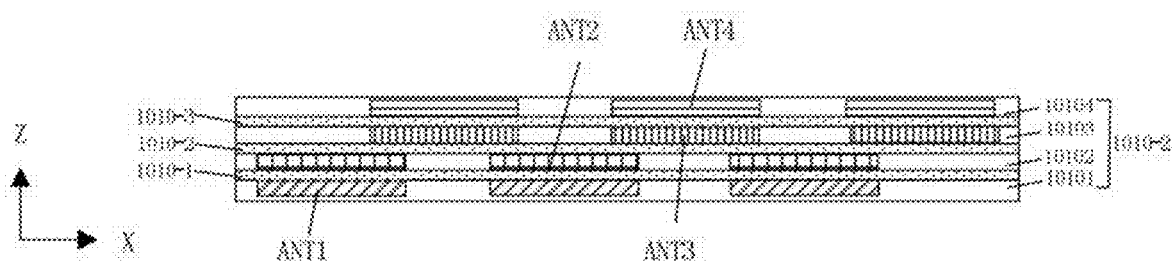

FIG. 7o shows a schematic diagram of an array arrangement of the first coils ANT1 on the first stacked layer 10101 along the first direction X and the second direction Y. FIG. 7p shows a schematic diagram of an array arrangement of the second coils ANT2 along the first direction X and the second direction Y on the second stacked layer 10102. FIG. 7q shows a schematic diagram of an array arrangement of the third coils ANT3 along the first direction X and the second direction Y on the third stacked layer 10103. FIG. 7r shows a schematic diagram of an array arrangement of the fourth coils ANT4 on the fourth stacked layer 10104 along the first direction X and the second direction Y. Wherein, a schematic diagram of a planar structure of four stacked layers in FIGS. 7o to 7r after stacking is shown in FIG. 7n. FIG. 7s is a cross-sectional view of FIG. 7n along M5-M5.

In an exemplary implementation mode, there are a third overlapping region B3 and a fourth overlapping region B4 on orthographic projections of adjacent interaction units 1011 on a plane where one of the stacked layers is located, so that the interaction apparatus 10 may recognize an interaction object in all regions interacting with the interaction object, so that each region is covered by an antenna coil. In an exemplary implementation mode, in a structure of the interaction apparatus including the display module 107, a display region of the display module 107 is set to a position corresponding to multiple antenna coils in the interaction module 101, and there are a third overlapping region B3 and a fourth overlapping region B4 in orthographic projections of antenna coils in adjacent interaction units 1011 on a stacked layer, so that every place in the display region may be covered by a coil.

In an exemplary implementation mode, antenna coils on each stacked layer in the interaction module 101 are arranged at intervals to avoid interference between antenna coils of a same layer during operation.

In some exemplary implementation modes, an arrangement of antenna coils shown in FIGS. 7m to 7s and 7b to 7k may be as shown in FIG. 7a, four adjacent coils are respectively a first coil ANT1, a second coil ANT2, a third coil ANT3, and a fourth coil ANT4. A1, A2, A3, and A4 are regions where orthographic projections of the four adjacent coils ANT1, ANT2, ANT3, and ANT4 on a plane where one of the film layers or stacked layers is located are not overlapped with each other.

Figure 7T:
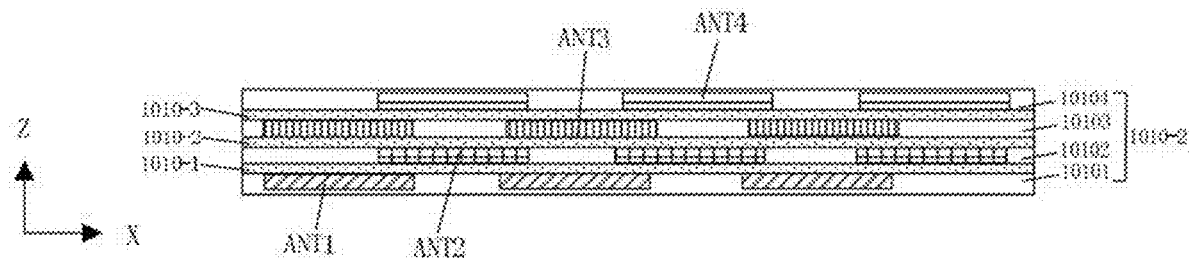
Figure 7U:
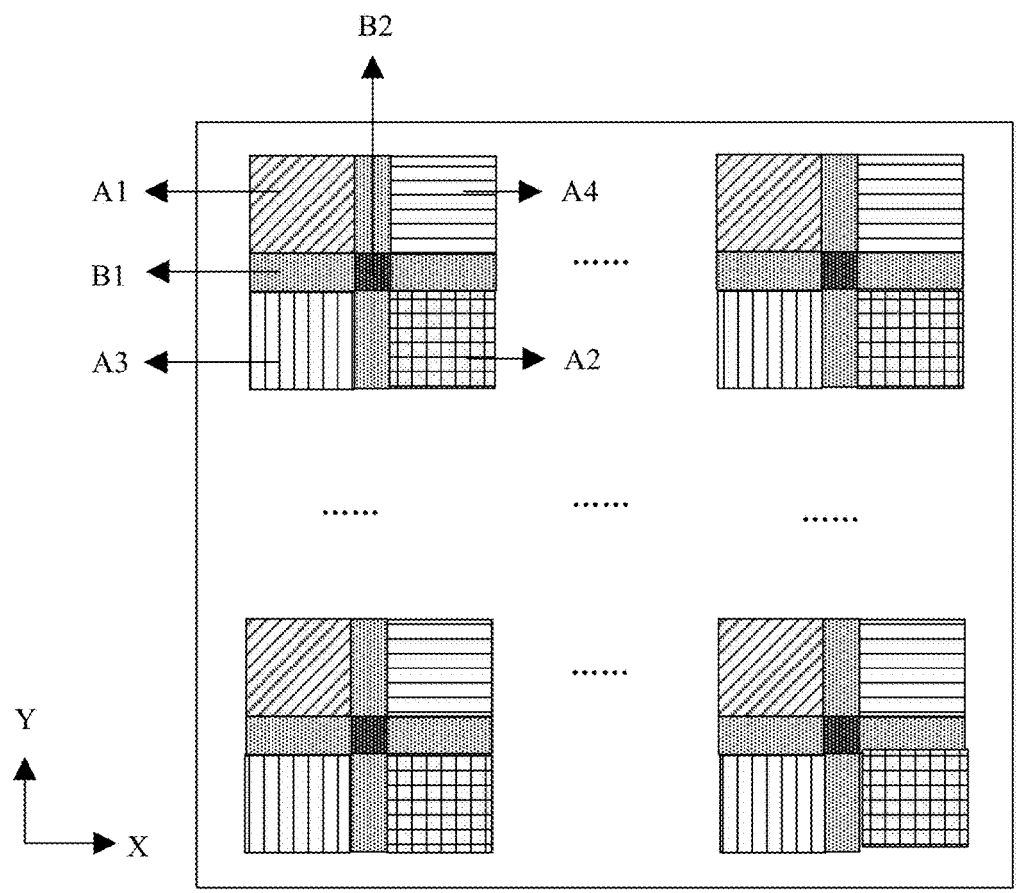

In other implementation modes, an arrangement of antenna coils shown in FIGS. 7m to 7s and 7b to 7k may be as shown in FIG. 7u, wherein FIGS. 7t and 7l are one cross-sectional view along a second direction Y in a structure shown in FIG. 7u.

In an exemplary implementation mode, an arrangement of antennas in the interaction module 101 is not limited to a case in which adjacent antenna coils have a first overlapping region B1 and a second overlapping region B2, or have a third overlapping region B3 and a fourth overlapping region B4, and may be set to have only the first overlapping region or the third overlapping region, or there is no overlapping region between adjacent antenna coils, which is not limited in the present disclosure.

In an exemplary implementation mode, the interaction module 101 may be configured as a film layer, and multiple antenna coils may be arranged in a same stacked layer, and there is no overlapping region between orthographic projections of adjacent antenna coils on a plane where the film layer is located, so as to avoid mutual interference between adjacent antennas during operation.

In an exemplary implementation mode, multiple antenna coils corresponding to multiple interaction units 1011 may be provided on a PCB board, and in a practical application, a square winding manner may be adopted for the antenna coils, and a side length of a square antenna coil may be set to twice a recognizable distance when communicating with an interaction object. For example, the recognizable distance between the PCB board and the interaction object is 20 mm, then the side length of the square antenna coil is set to 40 mm. In an exemplary implementation mode, a recognizable distance may be a distance range within which the interaction apparatus can normally interact with the interaction object. Within a range of a recognizable distance, the interaction apparatus can communicate with the interaction object normally. When a distance between the interaction apparatus and the interaction object exceeds the recognizable distance, there may be situations in which the interaction object cannot be recognized or the interaction object cannot be communicated normally.

In an exemplary implementation mode, an optical touch manner may be adopted for the positioning module 103, for example, an infrared touch manner. For positioning through an optical touch manner, the positioning module 103 may not be provided with a metal, thereby avoiding interference when an interaction unit 1011 performs data interaction with a data interaction object.

Figure 8A:
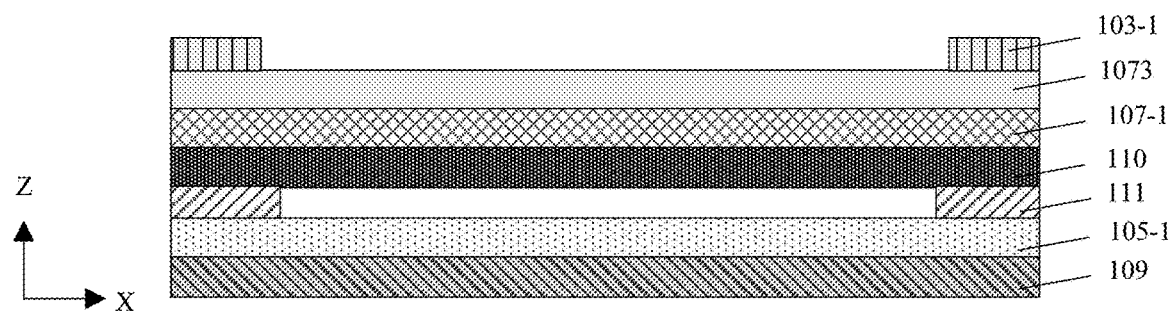
FIG. 8a is a cross-sectional view of a data interaction apparatus in an exemplary embodiment of the present disclosure.
Figure 8B:
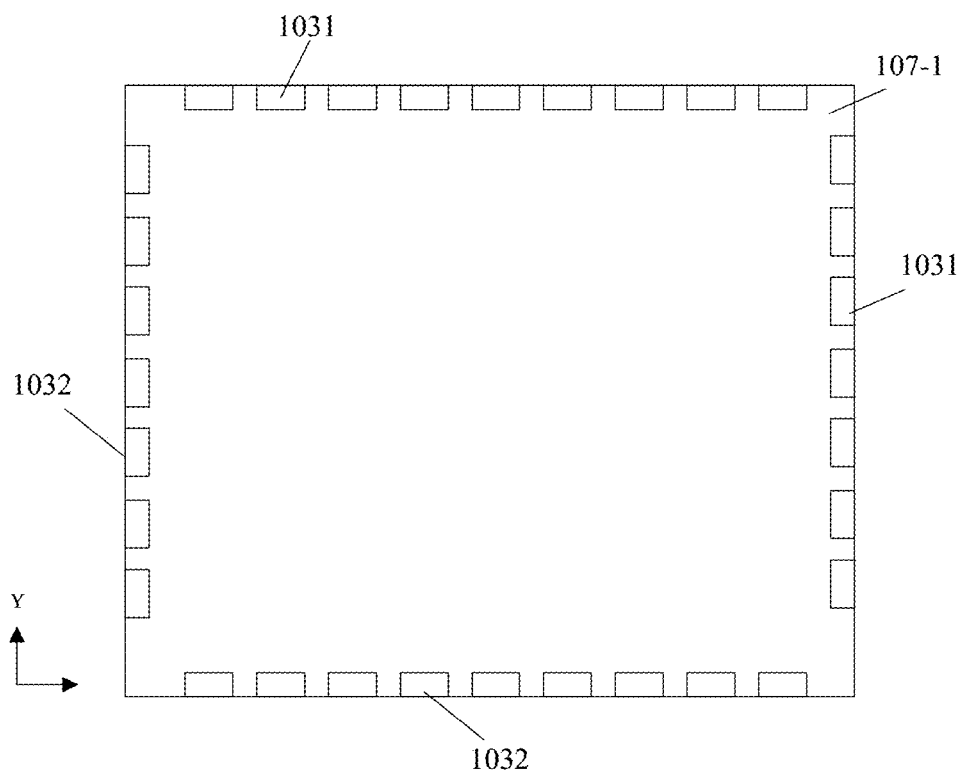
FIG. 8b is a schematic diagram of a planar structure of a data interaction apparatus in an exemplary embodiment of the present disclosure.

In an exemplary implementation mode, as shown in FIG. 8a, which is a cross-sectional view in the interaction apparatus 10, the drive module 105 includes a drive module layer 105-1, the display module 107 includes a display module layer 107-1, and the positioning module 103 includes a positioning module layer 103-1. The drive module layer 105-1, the display module layer 107-1, and the positioning module layer 103-1 are sequentially disposed along a third direction Z. The positioning module layer 103-1 is disposed on a side of the display module layer 107-1 away from the drive module layer 105-1. FIG. 8b is a schematic diagram of a planar structure of FIG. 8a observed in the third direction. The positioning module layer 103-1 includes multiple infrared receiving terminals 1031 disposed at an edge of a display region of the display module layer 107-1 and multiple infrared emitting terminals 1032 disposed corresponding to the multiple infrared receiving terminals 1031 in one-to-one correspondence. Multiple interaction units 1011 may be provided on the display module layer 107-1 or the drive module layer 105-1, and an infrared emitting terminal 1032 and an infrared receiving terminal 1031 form a positioning detection region in an interaction region of the multiple interaction units 1011. An infrared emitting terminal 1032 is configured to emit an infrared signal to an infrared receiving terminal 1031, and an infrared receiving terminal 1031 is configured to receive an infrared signal emitted by a corresponding infrared emitting terminal 1032, generate positioning information of an interaction object when the interaction object is located in a positioning detection region, and send the positioning information of the interaction object to the control module 104.

In an exemplary implementation mode, orthographic projections of a positioning detection region formed by the positioning module layer 103-1, a display region formed by the display module layer 107-1, and an interaction region formed by multiple interaction units in the interaction module on a plane where the display module layer 107-1 is located are overlapped with each other.

In a structure shown in FIG. 8b, an infrared emitting terminal 1032 may be an infrared light emitting diode and an infrared receiving terminal 1031 may be an infrared light photodiode.

Figure 8C:
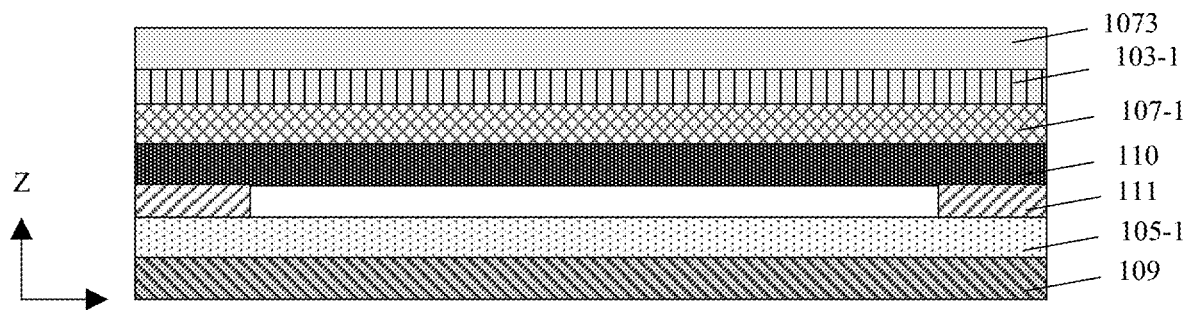
FIG. 8c is a cross-sectional view of a data interaction apparatus in an exemplary embodiment of the present disclosure.
Figure 8D:
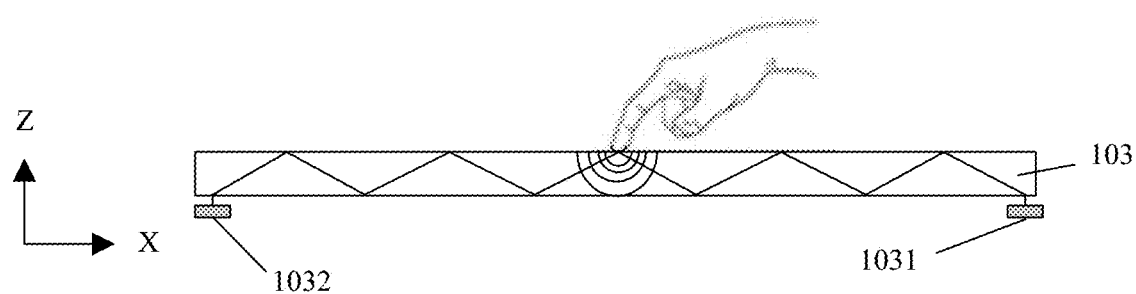
FIG. 8d is a cross-sectional view of a positioning module in an exemplary embodiment of the present disclosure.

In an exemplary implementation mode, as shown in FIG. 8c, the data interaction apparatus 10 may include a protection layer 1073, and the positioning module layer 103-1 is disposed between the display module layer 107-1 and the protection layer 1073; wherein the positioning module layer 103-1 is a flat infrared touch. In this structure, a material for making the positioning module layer 103-1 may include a total reflective transparent material, for example the total reflective transparent material may include, but is not limited to, Flatfrog in-glass touch. Multiple infrared emitting terminals in the positioning module layer 103-1 and multiple infrared receiving terminals 1032 corresponding to the multiple infrared emitting terminals 1031 in one-to-one correspondence are disposed in the total reflection transparent material. As shown in FIG. 8d, which is a working principle diagram of the positioning module layer 103-1 shown in FIG. 8c, an infrared emitting tube 1032 and an infrared receiving tube 1031 are located below the protection layer 1073, and uniform infrared light is formed on a surface of the display module layer 107-1 through projecting, when there is touch, infrared light at a corresponding position becomes weaker, so that the corresponding position may be detected.

In an exemplary implementation mode, a light emitting terminal 1031 and a light receiving terminal 1032 in the positioning module layer 103-1 are not limited to an infrared receiver and an infrared emitter, or may be an emitter and a receiver of other light as long as a positioning function of the positioning module 103 may be achieved.

Figure 8E:
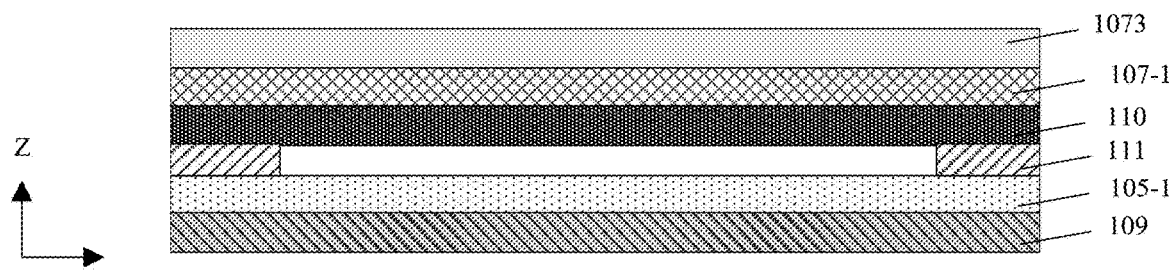
FIG. 8e is a cross-sectional view of a data interaction apparatus in an exemplary embodiment of the present disclosure.
Figure 8F:
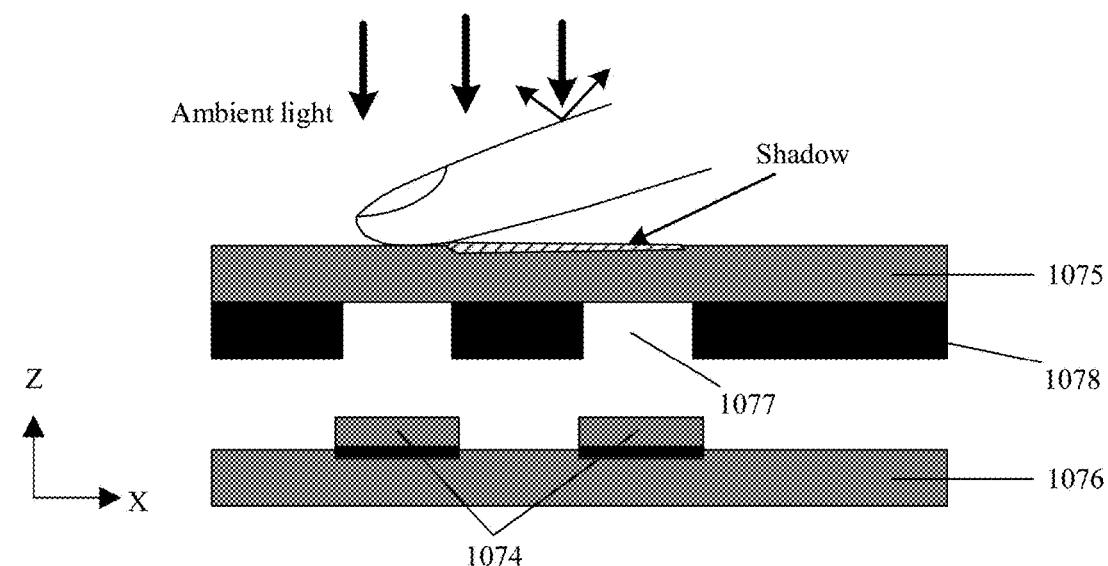
FIG. 8f is a cross-sectional view of a display module in an exemplary embodiment of the present disclosure.

In an exemplary implementation mode, as shown in FIGS. 8e to 8f, which are schematic diagrams of a cross-sectional structure of integrating the positioning module layer 103-1 into the display module layer 107-1, the display module layer 107-1 includes a display substrate 1076 and a filter element 1075 disposed oppositely. Multiple photosensitive elements 1074 are disposed on the display substrate, and the positioning module layer 103-1 includes multiple photosensitive elements 1074. The photosensitive elements 1074 and orthographic projections of multiple photosensitive regions 1077 on the filter element 1075 on the display substrate 1076 are at least partially overlapped, or the photosensitive elements 1074 are disposed in gaps among multiple filter regions 1078 on the filter element 1075. As shown in FIG. 8f, when an interaction object approaches the display module layer 107-1, light at a corresponding position is blocked and a light change is sensed through the photosensitive elements 1074, thereby achieving touch detection. The photosensitive elements 1074 are reserved when manufacturing a Thin Film Transistor (TFT) substrate, each element of three primary colors of red, green, and blue (RGB) in the display module layer 107-1 may be correspondingly provided with a photosensitive element. A photosensitive element 1074 may generate an induced current or an induced voltage according to a change in light. When ambient light changes, a controller or the control module 104 in the positioning module 103 may determine whether overall brightness changes or whether brightness of a local region changes according to the induced current or induced voltage generated by the photosensitive element 1074. As shown in FIG. 8f, when ambient light is incident through the filter element 1075, if a region of the display module layer 107-1 is blocked by an interaction object or another object, a shadow is formed on the display module layer 107-1, and an induced current of the photosensitive element 1074 changes. The controller or the control module 104 in the positioning module 103 determines whether overall ambient light changes or local light changes due to occlusion of an object according to currents or voltages induced by all the photosensitive elements 1074 in the display module layer 107-1. If all of the photosensitive elements 1074 have identical or similar changes in induced currents, it may be determined that the ambient light has changed, and no interaction object is approaching. If only induced currents of local photosensitive elements 1074 have changed, it may be determined that an interaction object is approaching. At this time, the positioning module 103 sends corresponding positioning information to the control module 104, and the control module 104 controls a corresponding switch to turn on a target interaction unit. When the target interaction unit detects that there is an interaction object, data interaction is performed with the interaction object.

Figure 8G:
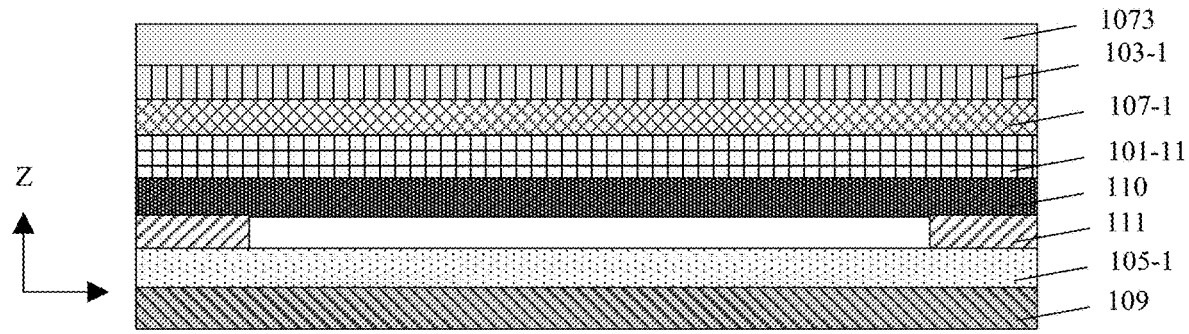
FIG. 8g is a cross-sectional view of a data interaction apparatus in an exemplary embodiment of the present disclosure.

In an exemplary implementation mode, the interaction module layer 101-11 may be disposed on the drive module layer 105-1, the drive module layer 105-1 is disposed on a side of the display module layer 107-1 away from the positioning module layer 103-1, as shown in FIGS. 8a, 8c, and 8e. Or, the interaction module layer 101-11 may be integrated on the display module layer 107-1, or the interaction module layer 101-11 is disposed between the display module layer 107-1 and the drive module layer 105-1, as shown in FIG. 8g.

In an exemplary implementation mode, both the positioning module layer 103-1 and the interaction module layer 101-11 may be integrated on the display module layer 107-1 to reduce a manufacturing cost of the interaction apparatus 10.

In the exemplary implementation mode, as shown in FIGS. 8a, 8c, 8e, and 8g, the data interaction apparatus 10 is provided with a protection layer 1073 on a side of the display film layer 107-1 located in the third direction, and the protection layer 1073 may function to prevent damage to glass in the display module layer 107-1 and may function to prevent reflection of the glass.

In an exemplary implementation mode, the switch module 102 may be manufactured on the interaction module layer 101-11 or may be manufactured on the drive module layer 105-1, which is not limited in the present disclosure.

In an exemplary implementation mode, as shown in FIGS. 8a, 8c, 8e, and 8g, the data interaction apparatus 10 may include an optical film layer 110 located on a side opposite to the third direction of the display module layer 107-1.

In an exemplary implementation mode as shown in FIGS. 8a, 8c, 8e, and 8g, the data interaction apparatus 10 may include a fixing module 111 configured to fix the optical film layer 110. A manufacturing material of the fixing module 111 includes a metal. In order to avoid interference of the metal to an antenna coil in the interaction module 101 during data interaction, a region of the fixing module 111 corresponding to the antenna coil in the interaction module 101 is configured with a hollow structure.

In an exemplary implementation mode, the drive module 105 may be a PCB-based drive board or may be a Polyethylene terephthalate (PET)-based drive board.

An application scenario of the data interaction apparatus 10 provided by the present disclosure is: an interaction object is a card carrying an NFC antenna coil, the data interaction apparatus 10 displays corresponding information through the display module 107, when the card approaches a display region in the display module 107, the positioning module 103 feeds back positioning information to the control module 104, the control module 104 controls a switch for turning on a target interaction unit corresponding to the positioning information, the drive module 105 drives the target interaction unit to perform data interaction with the interaction object, and feeds back data interaction information to the control module 104, and the control module 104 performs a corresponding operation according to the data interaction information and may control the display module 107 to display a result of performing the corresponding operation. For example, in a teaching application, an operation performed by the control module 104 may to call experimental data corresponding to data interaction information or related audio-visual teaching materials, and display them through the display module 107. To illustrate by taking a chemical experiment as an example: when two cards are placed simultaneously or successively in two or a same display region of the display module 107, the control module 104 acquires data interaction information of the two cards, the data interaction information corresponding to the two cards includes hydrogen and oxygen respectively and includes corresponding contents, then the control module 104 may call a corresponding chemistry lesson plan according to two pieces of data interaction information to display a chemical reaction of hydrogen and oxygen to generate water, and display corresponding chemical data or a corresponding chemical formula through the display module 107.

By carrying out teaching activities through the data interaction apparatus 10 provided in the present disclosure, experimental devices and chemical materials required for experiments may be reduced, teaching expenses may be saved, one or more dangers encountered in chemical experiments may be avoided, and teaching safety may be improved.

In another application scenario: the data interaction apparatus 10 may be applied to recreational activities or competitive competitions. For example, when playing Go or chess, the positioning module 103 may be used for positioning, and a falling position of a chess piece is determined through multiple interaction units 1011. The control module 104 records position information of the chess piece according to data interaction information fed back by the interaction units 1011, and may determine an outcome of both sides playing chess by tracking the position information of chess pieces, and may display a determined final result of the outcome through the display module 107. In this application, the control module 104 may display previous records by controlling the display module 107, and review records of recreational activities or competitive competitions, so as to avoid one or more disadvantages of human forgetting or human recording errors.

In some application scenarios, each interaction object may be set with an Identity document (ID for short) information for identifying an identity. The control module 104 performs a corresponding operation according to ID information of an interaction object, for example, after the control module 104 acquires the ID information of the interaction object, the control module 104 calls a corresponding teaching case and controls the display module to display, or performs calculation corresponding to the ID information and control the display module to display a calculation result. In this application scenario, different interaction objects have different pieces of ID information, and the control module performs operations set in advance corresponding to ID information according to the ID information of different interaction objects.

In other application scenarios, an execution operation corresponding to a position corresponding to each interaction unit may be set in the control module 104. After data interaction is performed between an interaction object and a target interaction unit, data interaction information fed back to the control module may contain information of the interaction object and the target interaction unit or may only contain information of the target interaction unit, and the control module can perform an operation according to a corresponding target interaction unit.

An embodiment of the present disclosure further provides an electronic device, including the data interaction apparatus according to any one of the aforementioned embodiments.

In an exemplary implementation mode, the electronic device may be any product or component with a data interaction function such as a display panel, a recreational activity device, a competition device, a teaching device, chess desktop, a teaching aid, an experimental device, a mobile phone, a tablet computer, a television, a display, and a laptop computer.

An embodiment of the present disclosure further provides a data interaction method, which is applied to the data interaction apparatus according to any one of the aforementioned embodiments. The method includes following acts.

Act S1: when an interaction object is located in a positioning detection region, positioning information of the interaction object is generated, wherein the positioning detection region is formed by a positioning module, and the positioning module is disposed in an interaction region of an interaction module.

Act S2: a target switch unit and a target interaction unit corresponding to the positioning information are determined according to the positioning information; wherein the target interaction unit is at least one of multiple interaction units in the interaction module, and the target switch unit is at least one of multiple switch units in a switch module.

Act S3: the target interaction unit is controlled through the target switch unit to enter an interaction state, the target interaction unit is driven to perform data interaction with the interaction object, and data interaction information from the interaction object is acquired.

In an exemplary implementation mode, the data interaction method may include: setting a resistance-capacitance matching value according to the target interaction unit.

In an exemplary implementation mode, the setting the resistance-capacitance matching value according to the target interaction unit may include: searching a target resistance-capacitance value corresponding to the target interaction unit from a resistance-capacitance value matching table, and adjusting a resistance-capacitance value adjustment point according to the target resistance-capacitance value to set a resistance-capacitance matching value of a drive module.

An embodiment of the present disclosure further provides a non-transitory computer-readable storage medium configured to store computer program instructions, wherein when the computer program instructions are executed, the data interaction method according to any one of the aforementioned embodiments may be implemented.

According to the data interaction apparatus and interaction method thereof, the electronic device, and the storage medium provided in the embodiments of the present disclosure, the positioning information of the interaction object is fed back to the control module through the positioning module. The control module determines the corresponding target interaction unit according to the positioning information, and controls the target switch unit corresponding to the target interaction unit to communicate the target interaction unit with the drive module. The drive module drives the target interaction unit to perform data interaction with the interaction object under control of the control module. When the interaction unit is required to interact with the interaction object, only the interaction switch in the region corresponding to the interaction object is turned on, and the drive module is not required to turn on each interaction unit in turn through polling, thus saving time of data interaction and improving a data interaction efficiency. Multiple interaction units in the data interaction apparatus are driven by only one drive module, thereby saving a cost. When the data interaction apparatus interacts with an interaction object, only one drive module runs, which may reduce power consumption.

It may be understood by those of ordinary skill in the art that all or some acts in the method disclosed above and function modules/units in a system and an apparatus may be implemented as software, firmware, hardware, and a proper combination thereof. In a hardware implementation mode, division of the function modules/units mentioned in the above description is not always division corresponding to physical components. For example, a physical component may have multiple functions, or several physical components may cooperate to execute a function or an act. Some components or all components may be implemented as software executed by a processor such as a digital signal processor or a microprocessor, or implemented as hardware, or implemented as an integrated circuit such as an application specific integrated circuit. Such software may be distributed in a computer-readable medium, and the computer-readable medium may include a computer storage medium (or a non-transitory medium) and a communication medium (or a transitory medium). As known to those of ordinary skill in the art, the term computer storage medium includes volatile and nonvolatile, and removable and irremovable media implemented in any method or technology for storing information (for example, a computer-readable instruction, a data structure, a program module, or other data). The computer storage medium includes, but is not limited to, a Random Access Memory (RAM), a Read-Only Memory (ROM), an Electronically Erasable and Programmable Read Only Memory (EEPROM), a flash memory or another memory technology, a Compact Disc Read-Only Memory (CD-ROM), a Digital Versatile Disk (DVD) or another optical disk storage, a magnetic cassette, a magnetic tape, a magnetic disk storage, or another magnetic storage apparatus, or any other medium that may be configured to store desired information and may be accessed by a computer. In addition, it is known to those of ordinary skill in the art that a communication medium usually includes a computer-readable instruction, a data structure, a program module, or other data in a modulated data signal, such as a carrier or another transmission mechanism, and may include any information delivery medium.

The drawings of the embodiments of the present disclosure only involve structures involved in the embodiments of the present disclosure, and other structures may refer to conventional designs.

The embodiments of the present disclosure, that is, features in the embodiments, may be combined with each other to obtain new embodiments if there is no conflict.

Although the implementation modes disclosed in the embodiments of the present disclosure are described above, the described contents are only implementation modes for facilitating understanding of the embodiments of the present disclosure, which are not intended to limit the embodiments of the present disclosure. A person skilled in the art to which the embodiments of the present disclosure pertain may make any modifications and variations in forms and details of implementation without departing from the spirit and scope of the embodiments of the present disclosure. Nevertheless, the scope of patent protection of the embodiments of the present disclosure shall still be subject to the scope defined by the appended claims.

The invention claimed is:

1. A data interaction apparatus, comprises an interaction processor, a switch processor, a positioning processor, a control processor, and a drive processor, wherein:
   the interaction processor comprises multiple interaction units, at least one interaction unit is configured to perform data interaction with an interaction object in an interaction region;

the switch processor comprises multiple switch units corresponding to the multiple interaction units, each switch unit is configured to communicate the interaction processor with the drive processor under control of the control processor;

the positioning processor is disposed in the interaction region of the interaction processor to form a positioning detection region in the interaction region, and is configured to generate positioning information of the interaction object when the interaction object is located in the positioning detection region;

the control processor is connected with the positioning processor and the switch processor, and is configured to determine a target switch unit and a target interaction unit corresponding to the positioning information according to the positioning information, and control the target switch unit to communicate the target interaction unit with the drive processor;

the drive processor is connected with the control processor and the switch processor, and is configured to drive the target interaction unit to perform data interaction with the interaction object, and send data interaction information from the interaction object to the control processor;

the interaction processor is configured as multiple film layers, and each of the interaction units comprises an antenna coil; and in the interaction processor, antenna coils of two adjacent interaction units are located in different film layers, and there is an overlapping region in orthographic projections of regions enclosed by the antenna coils of the two adjacent interaction units on a plane where one of the film layers is located.

2. The data interaction apparatus according to claim 1, wherein the drive processor is provided with a resistance-capacitance value adjustment point, and the control processor or the drive processor stores a resistance-capacitance value matching table;

the control processor is configured to search a target resistance-capacitance value corresponding to the target interaction unit from the resistance-capacitance value matching table, and adjust the resistance-capacitance value adjustment point according to the target resistance-capacitance value to set a resistance-capacitance matching value of the drive processor.

3. The data interaction apparatus according to claim 1, wherein a matching resistance-capacitance circuit is disposed between each of the interaction units and the switch processor; the matching resistance-capacitance circuit comprises a first parallel capacitor circuit, a second parallel capacitor circuit, a series resistor circuit, and a parallel resistor circuit;

the first parallel capacitor circuit comprises a first capacitor and a second capacitor connected in parallel, one terminal is connected with an antenna in the interaction unit, and the other terminal is connected with the series resistor circuit;

the second parallel capacitor circuit comprises a third capacitor and a fourth capacitor connected in parallel, one terminal is connected with the series resistor circuit, and the other terminal is connected with ground;

the series resistor circuit comprises a first resistance, one terminal is connected with the first parallel capacitor circuit, and the other terminal is connected with the ground; and the parallel resistor circuit comprises a second resistor connected in parallel with the second parallel capacitor circuit.

4. The data interaction apparatus according to claim 1, wherein the drive processor comprises a drive chip, a filter circuit, a capacitance matching circuit, and a resistance-capacitance circuit;

the drive chip is connected with the filter circuit and the resistance-capacitance circuit, and is configured to output a data signal to the filter circuit, receive data interaction information from the resistance-capacitance circuit, and send the data interaction information to the control processor;

the filter circuit is connected with the drive chip and the capacitance matching circuit, and is configured to filter the data signal and send the filtered data signal to the capacitance matching circuit;

the capacitance matching circuit is connected with the filter circuit, the resistance-capacitance circuit, and the switch processor, and is configured to adjust the filtered data signal, send the adjusted data signal to the switch processor, receive data interaction information from the switch processor, and send the data interaction information to the resistance-capacitance circuit; and the resistance-capacitance circuit is connected with the drive chip and the capacitance matching circuit, and is configured to receive data interaction information from the capacitance matching circuit, adjust the data interaction information, and send the adjusted data interaction information to a signal receiving terminal of the drive chip.

5. The data interaction apparatus according to claim 4, wherein the drive processor may comprise a differential-to-single terminal circuit, the differential-to-single terminal circuit comprises a first signal channel and a second signal channel; the filter circuit comprises a first filter sub-circuit and a second filter sub-circuit; the capacitance matching circuit comprises a first capacitance matching sub-circuit and a second capacitance matching sub-circuit; the drive chip comprises a first signal output terminal, a second signal output terminal, and a signal receiving terminal;

the first filter sub-circuit comprises a first inductor and a fifth capacitor; one terminal of the first inductor is connected with the first signal output terminal of the drive chip, and the other terminal is connected with the fifth capacitor; one terminal of the fifth capacitor is connected with the first inductor and the first capacitance matching sub-circuit, and the other terminal is connected with ground;

the second filter sub-circuit comprises a second inductor and a sixth capacitor; one terminal of the second inductor is connected with the second signal output terminal of the drive chip, and the other terminal is connected with the sixth capacitor; one terminal of the sixth capacitor is connected with the second inductor and the second capacitance matching sub-circuit, and the other terminal is connected with the ground;

the first capacitance matching sub-circuit comprises a seventh capacitor, one terminal of the seventh capacitor is connected with the first filter sub-circuit and the resistance-capacitance circuit, and the other terminal is connected with the first signal channel of the differential-to-single terminal circuit;

the second capacitance matching sub-circuit comprises an eighth capacitor, one terminal of the eighth capacitor is connected with the second filter sub-circuit, and the other terminal is connected with the second signal channel of the differential-to-single terminal circuit;

in the differential-to-single terminal circuit, one terminal of the first signal channel is connected with the first capacitance matching sub-circuit, and the other terminal is connected with the switch processor; one terminal of the second signal channel is connected with the second capacitance matching sub-circuit, and the other terminal is connected with the ground; the differential-to-single terminal circuit is configured to process data signals of two signal channels into a single-way signal and send the single-way signal to the switch processor, receive data interaction information from the switch processor, and send the data interaction information to the resistance-capacitance circuit through the first signal channel;

the resistance-capacitance circuit comprises a ninth capacitor, a third resistor, a tenth capacitor, and a fourth resistor; one terminal of the ninth capacitor is connected with the third resistor, and the other terminal is connected with the ground; one terminal of the third resistor is connected with the ninth capacitor, and the other terminal is connected with the signal receiving terminal of the drive chip and the tenth capacitor; one terminal of the tenth capacitor is connected with the signal receiving terminal of the drive chip, and the other terminal is connected with the fourth resistor; one terminal of the fourth resistor is connected with the tenth capacitor, and the other terminal is connected with the first capacitance matching sub-circuit; the resistance-capacitance circuit is configured to adjust data interaction information from the first capacitance matching sub-circuit and send the adjusted data interaction information to the signal receiving terminal of the drive chip.

6. The data interaction apparatus according to claim 1, further comprising a display processor;

the control processor is further connected with the display processor and is configured to control the display processor to display according to the data interaction information; and the display processor is connected with the control processor and is configured to display under control of the control processor.

7. The data interaction apparatus according to claim 6, wherein the drive processor comprises a drive processor layer, the display processor comprises a display processor layer, and the positioning processor comprises a positioning processor layer;

the drive processor layer, the display processor layer, and the positioning processor layer are sequentially disposed along a third direction, and the positioning processor layer comprises multiple infrared receiving terminals and multiple infrared emitting terminals set in one-to-one correspondence with the multiple infrared receiving terminals;

or, the interaction apparatus further comprises a protection layer, the positioning processor layer is disposed between the protection layer and the display processor layer, the positioning processor layer comprises a total reflection transparent material, multiple infrared receiving terminals, and multiple infrared emitting terminals set in one-to-one correspondence with the multiple infrared receiving terminals, and the multiple infrared emitting terminals and the multiple infrared receiving terminals are disposed in the total reflection transparent material;

or, the display processor layer comprises a display substrate and a filter element which are oppositely disposed, the display substrate is provided with multiple photosensitive elements, the positioning processor layer comprises the multiple photosensitive elements, and the multiple photosensitive elements and orthographic projections of multiple photosensitive regions on the filter element on the display substrate are at least partially overlapped.

8. The data interaction apparatus according to claim 1, wherein the interaction processor is configured as four film layers, antenna coils in four adjacent interaction units are respectively disposed on the four film layers, there is a first overlapping region in orthographic projections of regions enclosed by antenna coils of two adjacent interaction units on a plane where one of the film layers is located, and there is a second overlapping region in orthographic projections of regions enclosed by antenna coils of the four adjacent interaction units on a plane where one of the film layers is located.

9. The data interaction apparatus according to claim 8, wherein a rectangular winding manner is adopted for antenna coils in the interaction units;

a length of a first overlapping region formed by antenna coils arranged along a second direction, along the second direction, does not exceed $\frac{1}{6}$ of a length of a side length of a single antenna coil along the second direction; a length of a first overlapping region formed by antenna coils arranged along a first direction, along the first direction, does not exceed $\frac{1}{6}$ of a length of a side length of a single antenna coil along the first direction; a length of a second overlapping region along the first direction does not exceed $\frac{1}{6}$ of the length of the side length of the single antenna coil along the first direction; and a length of a second overlapping region along the second direction does not exceed $\frac{1}{6}$ of the length of the side length of the single antenna coil along the second direction.

10. The data interaction apparatus according to claim 8, wherein the four film layers comprise a first film layer, a second film layer, a third film layer, and a fourth film layer arranged in a stack, and antenna coils in four adjacent interaction units are respectively a first coil, a second coil, a third coil, and a fourth coil; multiple first coils are arranged at intervals on the first film layer in an array manner along the first direction and the second direction; multiple second coils are arranged at intervals on the second film layer in an array manner along the first direction and the second direction; multiple third coils are arranged at intervals on the third film layer in an array manner along the first direction and the second direction; and multiple fourth coils are arranged at intervals on the fourth film layer in an array manner along the first direction and the second direction.

11. The data interaction apparatus according to claim 1, wherein the interaction processor is configured as a single film layer, and each of the interaction units comprises an antenna coil;

in the interaction processor, antenna coils of two adjacent interaction units are arranged in a stack, an insulation layer is provided between stacked layers where the antenna coils of the two adjacent interaction units are located, and there is an overlapping region in orthographic projections of regions enclosed by the antenna coils of the two adjacent interaction units on a plane where one of the stacked layers is located.

12. The data interaction apparatus according to claim 11, wherein antenna coils of the multiple interaction units are configured as four stacked layers, antenna coils in four adjacent interaction units are respectively disposed on the four stacked layers, there is a third overlapping region in orthographic projections of regions enclosed by antenna coils of two adjacent interaction units on a plane where one of the stacked layers is located, and there is a fourth overlapping region in orthographic projections of regions enclosed by the antenna coils of the four adjacent interaction units on the plane where one of the stacked layers is located.

13. The data interaction apparatus according to claim 12, wherein a rectangular winding manner is adopted for antenna coils in the interaction units;
a length of a third overlapping region formed by antenna coils arranged along a second direction, along the second direction, does not exceed 1/6 of a length of a side length of a single antenna coil along the second direction; a length of a third overlapping region formed by antenna coils arranged along a first direction, along the first direction, does not exceed 1/6 of a length of a side length of a single antenna coil along the first direction; a length of a fourth overlapping region along the first direction does not exceed 1/6 of the length of the side length of the single antenna coil along the first direction; and a length of a fourth overlapping region along the second direction does not exceed 1/6 of the length of the side length of the single antenna coil along the second direction.

14. The data interaction apparatus according to claim 12, wherein the four stacked layers comprise a first stacked layer, a second stacked layer, a third stacked layer, and a fourth film layer arranged in a stack, and antenna coils in four adjacent interaction units are respectively a first coil, a second coil, a third coil, and a fourth coil; multiple first coils are arranged at intervals on the first stacked layer in an array manner along a first direction and a second direction; multiple second coils are arranged at intervals on the second stacked layer in an array manner along the first direction and the second direction; multiple third coils are arranged at intervals on the third stacked layer in an array manner along the first direction and the second direction; and multiple fourth coils are arranged at intervals on the fourth stacked layer in an array manner along the first direction and the second direction, wherein a first insulation layer is provided between the first stacked layer and the second stacked layer, a second insulation layer is provided between the second stacked layer and the third stacked layer, and a third insulation layer is provided between the third stacked layer and the fourth stacked layer.

15. The data interaction apparatus according to claim 1, wherein the switch processor comprises a main switch processor and a sub switch processor, wherein:
the main switch processor comprises multiple main switch units, each main switch unit is connected with the control processor, the drive processor, and at least one sub switch unit in the sub switch processor,
the sub switch processor comprises multiple sub switch units, each of which is connected with the control processor, a main switch unit, and an interaction unit;
the control processor is connected with the positioning processor, the multiple main switch units and the multiple sub switch units in the switch processor, and is configured to determine a sub switch unit and a target interaction unit corresponding to the positioning information according to the positioning information, use the determined sub switch unit as the target switch unit, and control the target switch unit and a main switch unit corresponding to the target switch unit to communicate the target interaction unit with the drive processor; and
the drive processor is connected with the control processor and the multiple main switch units in the main switch processor, and is configured to drive the target interaction unit to perform data interaction with the interaction object under control of the control processor.

16. An electronic device, comprising the data interaction apparatus according to claim 1.

17. A data interaction method applied to the data interaction apparatus according to claim 1, comprising:
generating positioning information of the interaction object when the interaction object is located in the positioning detection region; wherein the positioning detection region is formed by the positioning processor, and the positioning processor is disposed in the interaction region of the interaction processor;
determining the target switch unit and the target interaction unit corresponding to the positioning information according to the positioning information; wherein the target interaction unit is at least one of multiple interaction units in the interaction processor, and the target switch unit is at least one of multiple switch units in the switch processor; and
controlling the target interaction unit through the target switch unit to enter an interaction state, driving the target interaction unit to perform data interaction with the interaction object, and acquiring data interaction information from the interaction object.

18. The data interaction method according to claim 17, further comprising:
setting a resistance-capacitance matching value according to the target interaction unit.

19. A non-transitory computer-readable storage medium configured to store computer program instructions, wherein when the computer program instructions are executed, the data interaction method according to claim 17 is implemented.

* * * * *